US012425380B2

(12) United States Patent
Sood et al.

(10) Patent No.: US 12,425,380 B2
(45) Date of Patent: Sep. 23, 2025

(54) SECURE KEY MANAGEMENT FOR SERVICE MESH DEPLOYMENTS

(71) Applicant: Intel Corporation, Santa Clara, CA (US)

(72) Inventors: Kapil Sood, Portland, OR (US); Srinivasa Addepalli, San Jose, CA (US); Dong Guo, Kunshan (CN); Sakari Poussa, Espoo (FI); Kailun Qin, Shanghai (CN); Ismo Puustinen, Helsinki (FI); Veronika Karpenko, New Ross (IE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/288,955

(22) PCT Filed: Mar. 25, 2022

(86) PCT No.: PCT/US2022/021970
§ 371 (c)(1),
(2) Date: Oct. 30, 2023

(87) PCT Pub. No.: WO2023/075828
PCT Pub. Date: May 4, 2023

(65) Prior Publication Data
US 2024/0205198 A1    Jun. 20, 2024

(30) Foreign Application Priority Data

Oct. 28, 2021    (WO) ................ PCT/CN2021/127196

(51) Int. Cl.
*H04L 9/40* (2022.01)
(52) U.S. Cl.
CPC ...... *H04L 63/0428* (2013.01); *H04L 63/0823* (2013.01)

(58) Field of Classification Search
CPC .................. H04L 63/0428; H04L 63/0823
(Continued)

(56) References Cited

U.S. PATENT DOCUMENTS 10,061,915 B1 *  8/2018  Roth ................ G06F 21/50
10,505,917 B2 * 12/2019  Chhabra ............ H04L 63/061
(Continued)

FOREIGN PATENT DOCUMENTS

CN       112889040 A    6/2021
EP        3713152 A1    9/2020
(Continued)

OTHER PUBLICATIONS

"International Application Serial No. PCT/US2022/021970, International Search Report mailed Jul. 6, 2022", 3 pgs.
(Continued)

*Primary Examiner* — Amare F Tabor
(74) *Attorney, Agent, or Firm* — Schwegman Lundberg & Woessner, P.A.

(57) ABSTRACT

Various methods, systems, and use cases for securely managing, generating, and controlling access to keys in a service mesh are discussed herein. In various examples, key protection operations include service mesh signing key protection and service mesh communication key protection, for a secure transport session between services such as conducted with mutual transport layer security (mTLS). For instance, such key protection operations may be used to establish communications between the service host and another entity within the service mesh, in a secure transport session, based on use of a private key (secured using a confidential computing technology) in a secure enclave or other secure compute environment to sign one or more keys for the secure transport session.

20 Claims, 26 Drawing Sheets

(58) Field of Classification Search
USPC .......................................................... 713/153
See application file for complete search history.

(56) References Cited

U.S. PATENT DOCUMENTS

| | | | |
|---|---|---|---|
| 10,637,645 B2 * | 4/2020 | Gray | H04L 9/0897 |
| 11,475,140 B1 * | 10/2022 | Buonora | G06F 21/602 |
| 11,714,912 B2 * | 8/2023 | Moyer | G06F 21/53 |
| | | | 713/171 |
| 2020/0374205 A1 | 11/2020 | Sharma et al. | |
| 2021/0306308 A1 | 9/2021 | Wu et al. | |
| 2021/0377020 A1 * | 12/2021 | Kashid | H04L 9/083 |

FOREIGN PATENT DOCUMENTS

| | | |
|---|---|---|
| KR | 20180021251 A | 2/2018 |
| WO | WO-2023075828 A1 | 5/2023 |

OTHER PUBLICATIONS

"International Application Serial No. PCT/US2022/021970, Written Opinion mailed Jul. 6, 2022", 4 pgs.

* cited by examiner

SECURE KEY MANAGEMENT FOR SERVICE MESH DEPLOYMENTS

PRIORITY CLAIM

This application is a U.S. National Stage Application under 35 U.S.C. 371 from International Application No. PCT/US2022/021970, filed Mar. 25, 2022, published as WO 2023/075828, which claims the benefit of priority to International Application No. PCT/CN2021/127196, filed Oct. 28, 2021, all of which are incorporated herein by reference in their entirety.

BACKGROUND

Edge computing, at a general level, refers to the implementation, coordination, and use of computing and resources at locations closer to the "edge" or collection of "edges" of the network. The purpose of this arrangement is to improve total cost of ownership, reduce application and network latency, reduce network backhaul traffic and associated energy consumption, improve service capabilities, and improve compliance with security or data privacy requirements (especially as compared to conventional cloud computing). Components that can perform edge computing operations ("edge nodes") can reside in whatever location needed by the system architecture or ad hoc service (e.g., in a high performance compute data center or cloud installation; a designated edge node server, an enterprise server, a roadside server, a telecom central office; or a local or peer at-the-edge device being served consuming edge services).

Applications that have been adapted for edge computing include but are not limited to virtualization of traditional network functions (e.g., to operate telecommunications or Internet services) and the introduction of next-generation features and services (e.g., to support 5G network services). Use-cases which are projected to extensively utilize edge computing include connected self-driving cars, surveillance, Internet of Things (IoT) device data analytics, video encoding and analytics, location aware services, device sensing in Smart Cities, among many other network and compute intensive services.

Edge computing may, in some scenarios, offer or host a cloud-like distributed service, to offer orchestration and management for applications and coordinated service instances among many types of storage and compute resources. Edge computing is also expected to be closely integrated with existing use cases and technology developed for IoT and Fog/distributed networking configurations, as endpoint devices, clients, and gateways attempt to access network resources and applications at locations closer to the edge of the network.

Cloud Native (CN) programming is very rapidly emerging programming and services deployment paradigm that allows seamless scalability across functions, highly distributed deployments, demand-based scaling up/down, deployment agility, using a combination of cloud computing and edge computing concepts. A Service Mesh (e.g., the open source Istio Service Mesh) is the underlying software infrastructure that allows different Services or Functions to be deployed on "top" of the Service Mesh in a Cloud Native system. In this infrastructure and configuration, a variety of security and trust issues may occur.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
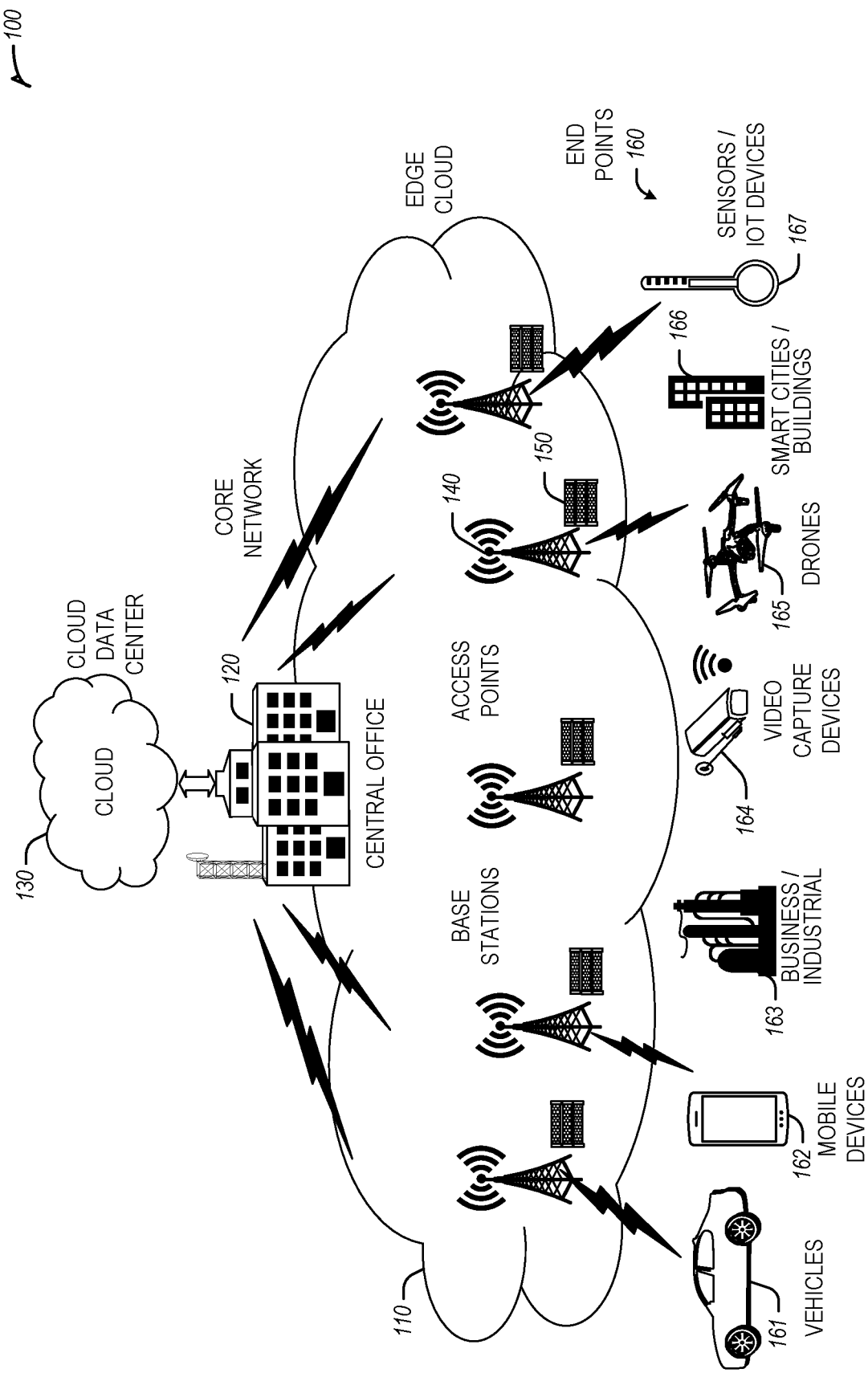
FIG. 1 illustrates an overview of an edge cloud configuration for edge computing.

The following examples generally relate to aspects of applying, verifying, and handling aspects of key management in distributed computing platforms. The approaches provided by these embodiments contributes towards improving the security within a Service Mesh, such as for operations in the Service Mesh relating to Certificate Authority (CA) key signing and the protection of mutual Transport Layer Security (mTLS) private keys.

In an example, various forms of confidential computing technology (e.g., Intel® Software Guard Extensions (SGX), Intel® Trust Domain Extensions (TDX), AMD® Secure Encrypted Virtualization (SEV), ARM® Confidential Compute Architecture (CCA), an Apple Secure Enclave architecture, etc.) can be used to protect the private keys used by respective services in a Service Mesh, whether the keys are at rest, in use, or in transit. With use of the confidential computing technology, Service Mesh key management functions may be performed inside attested execution environments (e.g., within SGX enclaves, using secure processing operations in a CPU or secure processing operations in a secure enclave processor or other cryptographically secure hardware), protecting the Service Mesh keys from a host OS/VMM, system and network admins, and malware on the system. This has the benefit of providing seamless extensions to a Service Mesh configuration (e.g., an Istio Service Mesh) using secure methods that are easy to upstream and adopt.

Existing implementations for a Cloud Native Service Mesh have no hardware-based solution for securing the key management functions, especially in distributed edge computing deployments but also in hosted, untrusted cloud native infrastructure deployments. Hardware-based mechanisms are not currently used to protect the highly security sensitive key management functions like secure key generation, trusted key signing, trusted certificate-based authentication, protection of secret keys used by mTLS, etc. Further, software-based security solutions do not offer an expected level of security, such as in scenarios where system operators are looking for keys to be protected from the higher privilege OS/VMM software and Guest/Host system administrators. Software-based security solutions, while not fully effective, also have the burden of using core partitioning, often wasting useful processor cores for managing complex policies and enforcement.

One of the common roles of a Service Mesh is to provide a mTLS-based communication between and across services or functions. For example, consider a Cloud Native Service Mesh (e.g., Istio) architecture, which conducts communications between proxies of respective services (e.g., an Envoy proxy) using mTLS-protected communications. Although mTLS communications are secure relative to outsiders, there are no security solutions prescribed in the architecture itself for ensuring protection of the mTLS communications, nor are there hardware-based secure key management extensions.

Lack of a hardware-assisted secure key management solution opens the entire deployment to multiple attacks originating from an open access to keys, namely, Man-in-the-Middle, Masquerading attacks, mTLS Session hijacking, lack of trust in communication functions, etc. It will be apparent that a variety of security risks and adverse events may occur when mTLS keys are not protected in "secured" communications between services—resulting in impeding deployments and trust in Service Mesh technology.

The following disclosed approaches apply to a variety of confidential or secured computing technologies, and types of service meshes, as discussed below. Many examples refer to Intel Software Guard Extensions (SGX) and Intel x86 compute architectures, but the present techniques are not limited to these platforms. Likewise, reference is made to various types of Istio Service Meshes and 5G use cases, but the present techniques are not limited to these service configurations or use cases. Additional details on the implementations and techniques for confidential computing are provided after the following overview of cloud and edge computing systems.

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
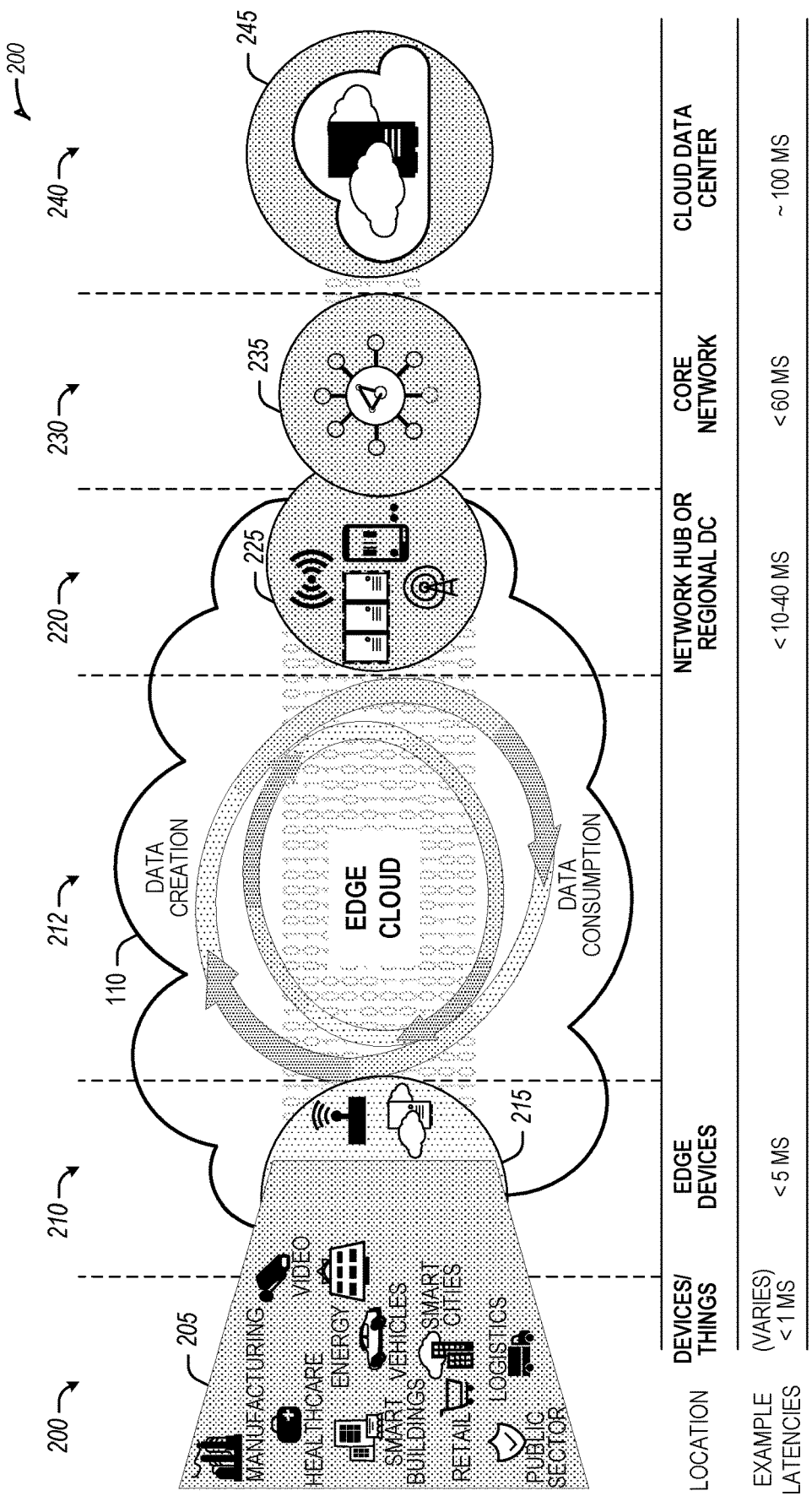
FIG. 2 illustrates operational layers among endpoints, an edge cloud, and cloud computing environments.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the edge devices layer 210, to even between 10 to 40 ms when communicating with nodes at the network access layer 220. Beyond the edge cloud 110 are core network 230 and cloud data center 240 layers, each with increasing latency (e.g., between 50-60 ms at the core network layer 230, to 100 or more ms at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 235 or a cloud data center 245, a central office or content data network may be considered as being located within a "near edge" layer ("near" to the cloud, having high latency values when communicating with the devices and endpoints of the use cases 205), whereas an access point, base station, on-premise server, or network gateway may be considered as located within a "far edge" layer ("far" from the cloud, having low latency values when communicating with the devices and endpoints of the use cases 205). It will be understood that other categorizations of a particular network layer as constituting a "close", "local", "near", "middle", or "far" edge may be based on latency, distance, number of network hops, or other measurable characteristics, as measured from a source in any of the network layers 200-240.

The various use cases 205 may access resources under usage pressure from incoming streams, due to multiple services utilizing the edge cloud. To achieve results with low latency, the services executed within the edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 110 (network layers 200-240), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

As such, the edge cloud 110 is formed from network components and functional features operated by and within edge gateway nodes, edge aggregation nodes, or other edge compute nodes among network layers 210-230. The edge cloud 110 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 110 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 110 may be servers, multi-tenant servers, appliance computing devices, and/or any other type of computing devices. For example, the edge cloud 110 may be hosted among one or more appliance computing device that is a self-contained processing system including a housing, case or shell. In some cases, edge devices are devices presented in the network for a specific purpose (e.g., a traffic light), but that have processing or other capacities that may be harnessed for other purposes. Such edge devices may be independent from other networked devices and provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 7B. The edge cloud 110 may also include one or more servers and/or one or more multi-tenant servers. Such a server may implement a virtual computing environment such as a hypervisor for deploying virtual machines, an operating system that implements containers, etc. Such virtual computing environments provide an execution environment in which one or more applications may execute while being isolated from one or more other applications.

Figure 3:
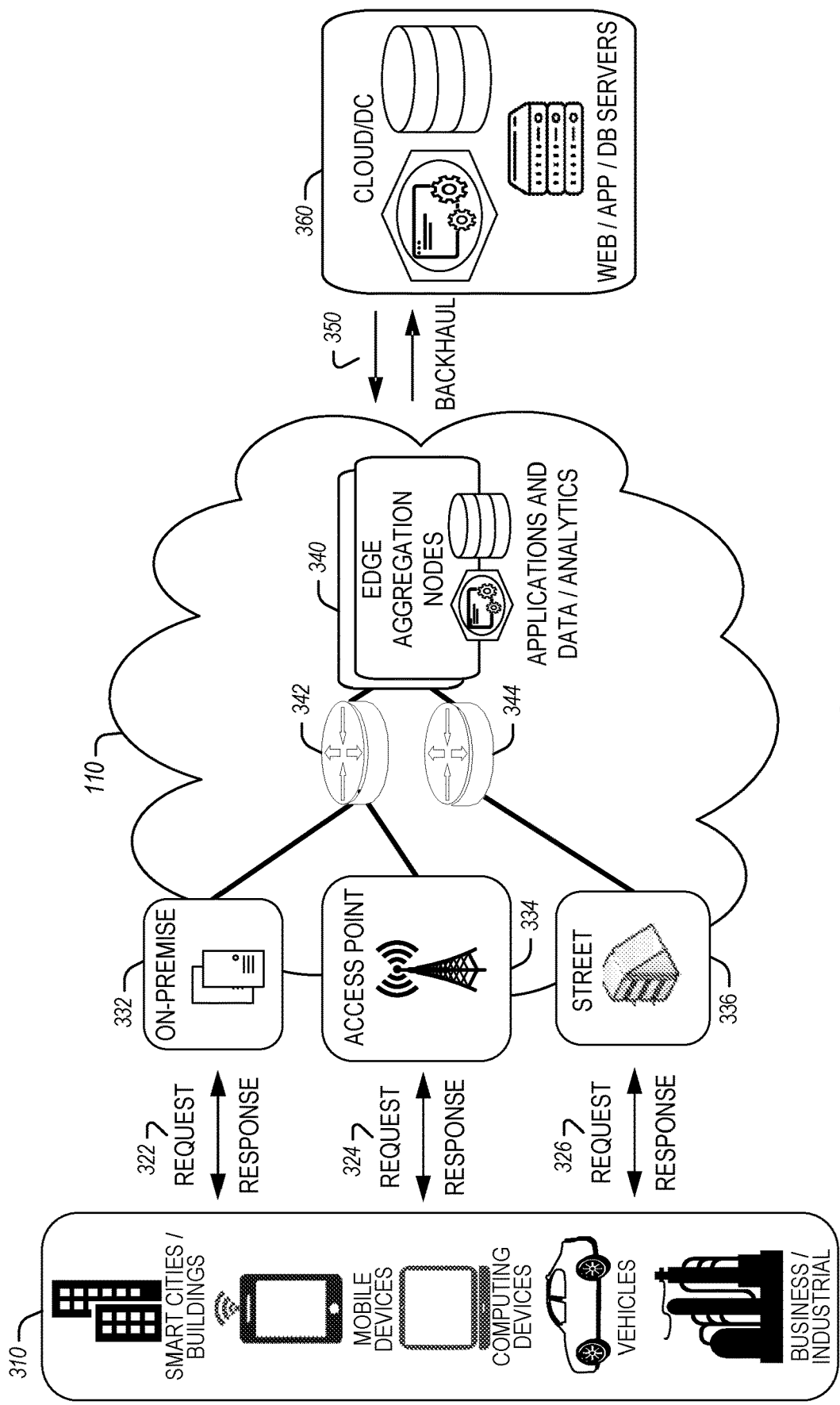
FIG. 3 illustrates an example approach for networking and services in an edge computing system.

In FIG. 3, various client endpoints 310 (in the form of mobile devices, computers, autonomous vehicles, business computing equipment, industrial processing equipment) exchange requests and responses that are specific to the type of endpoint network aggregation. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the edge cloud 110 to aggregate traffic and requests. Thus, within the edge cloud 110, the TSP may deploy various compute and storage resources, such as at edge aggregation nodes 340, to provide requested content. The edge aggregation nodes 340 and other systems of the edge cloud 110 are connected to a cloud or data center 360, which uses a backhaul network 350 to fulfill higher-latency requests from a cloud/data center for websites, applications, database servers, etc. Additional or consolidated instances of the edge aggregation nodes 340 and the aggregation points 342, 344, including those deployed on a single server framework, may also be present within the edge cloud 110 or other areas of the TSP infrastructure.

Figure 4:
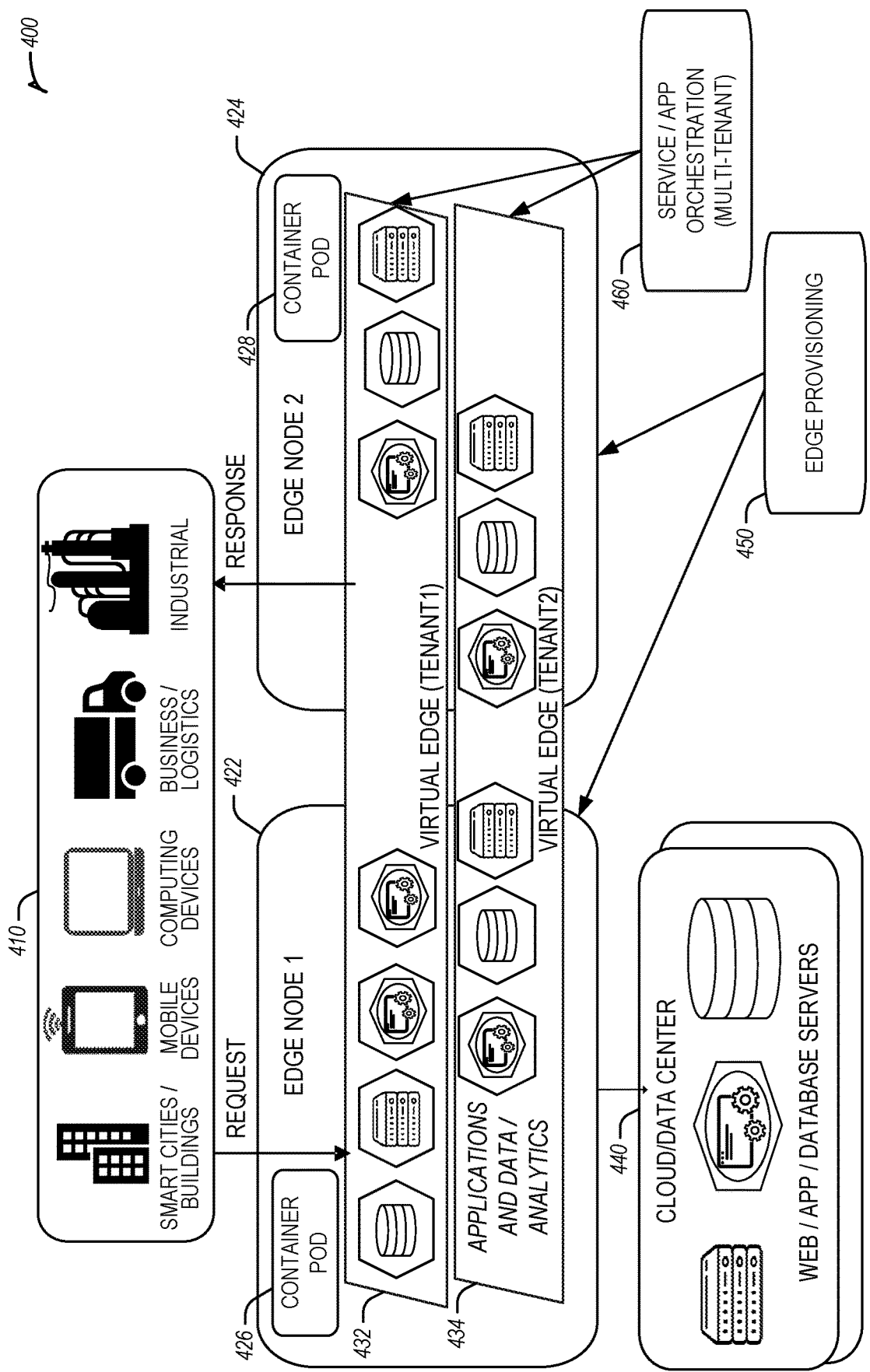
FIG. 4 illustrates deployment of a virtual edge configuration in an edge computing system operated among multiple edge nodes and multiple tenants.

FIG. 4 illustrates deployment and orchestration for virtual edge configurations across an edge computing system operated among multiple edge nodes and multiple tenants. Specifically, FIG. 4 depicts coordination of a first edge node 422 and a second edge node 424 in an edge computing system 400, to fulfill requests and responses for various client endpoints 410 (e.g., smart cities/building systems, mobile devices, computing devices, business/logistics systems, industrial systems, etc.), which access various virtual edge instances. Here, the virtual edge instances 432, 434 provide edge compute capabilities and processing in an edge cloud, with access to a cloud/data center 440 for higher-latency requests for websites, applications, database servers, etc.

However, the edge cloud enables coordination of processing among multiple edge nodes for multiple tenants or entities.

In the example of FIG. 4, these virtual edge instances include: a first virtual edge 432, offered to a first tenant (Tenant 1), which offers a first combination of edge storage, computing, and services; and a second virtual edge 434, offering a second combination of edge storage, computing, and services. The virtual edge instances 432, 434 are distributed among the edge nodes 422, 424, and may include scenarios in which a request and response are fulfilled from the same or different edge nodes. The configuration of the edge nodes 422, 424 to operate in a distributed yet coordinated fashion occurs based on edge provisioning functions 450. The functionality of the edge nodes 422, 424 to provide coordinated operation for applications and services, among multiple tenants, occurs based on orchestration functions 460.

It should be understood that some of the devices in 410 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 422, 424 may operate as security feature enforcement points for local resources allocated to multiple tenants per node. Additionally, tenant runtime and application execution (e.g., in instances 432, 434) may serve as an enforcement point for a security feature that creates a virtual edge abstraction of resources spanning potentially multiple physical hosting platforms. Finally, the orchestration functions 460 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes consisting of containers, FaaS engines, Servlets, servers, or other computation abstraction may be partitioned according to a DICE layering and fan-out structure to support a RoT context for each. Accordingly, the respective RoTs spanning devices 410, 422, and 440 may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 4. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each edge node 422, 424 may implement the use of containers, such as with the use of a container "pod" 426, 428 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 432, 434 are partitioned according to the needs of each container.

With the use of container pods, a pod controller oversees the partitioning and allocation of containers and resources. The pod controller receives instructions from an orchestrator (e.g., orchestrator 460) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 460 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked prior to the second pod executing.

Figure 5:
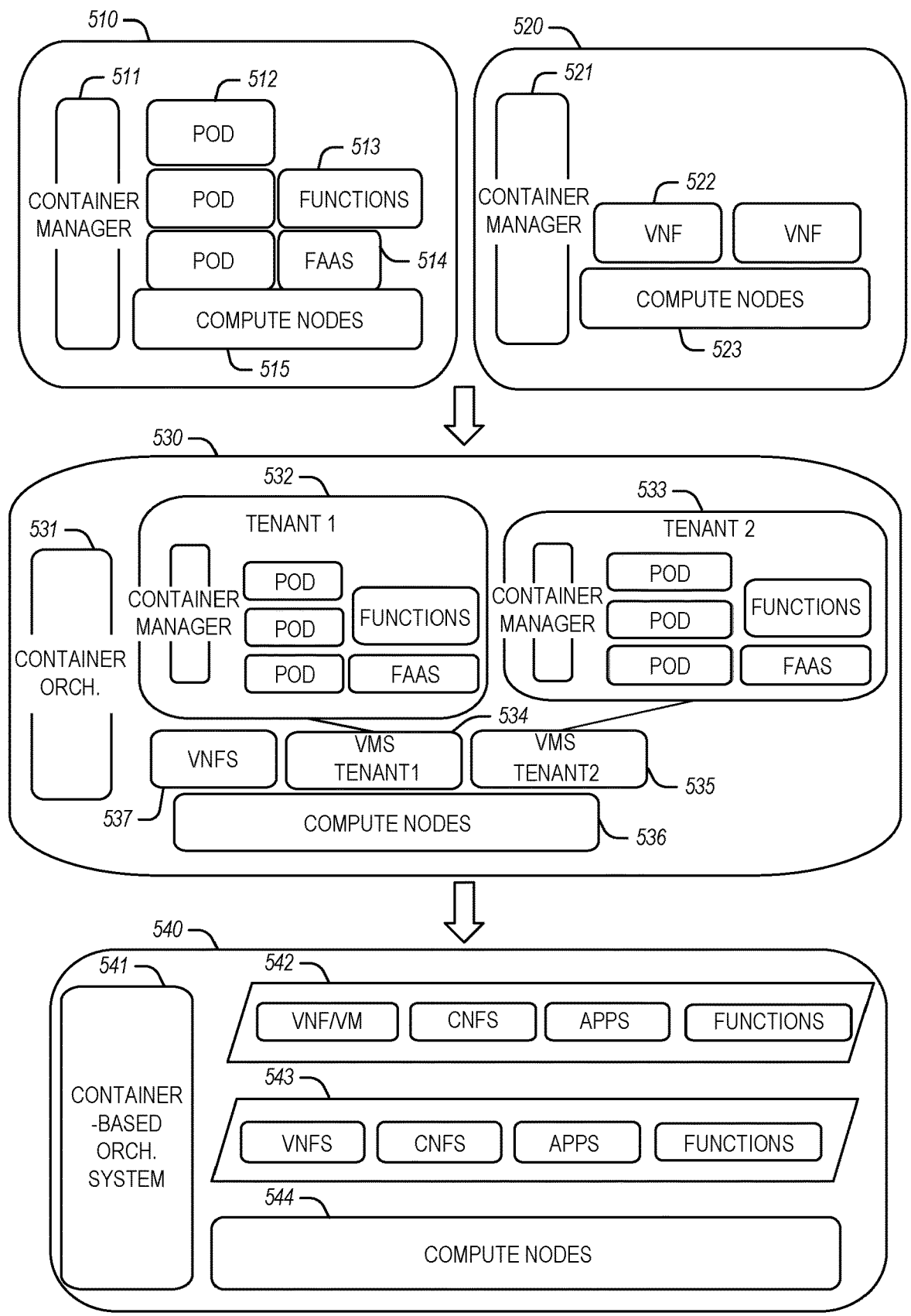
FIG. 5 illustrates various compute arrangements deploying containers in an edge computing system.

FIG. 5 illustrates additional compute arrangements deploying containers in an edge computing system. As a simplified example, system arrangements 510, 520 depict settings in which a pod controller (e.g., container managers 511, 521, and container orchestrator 531) is adapted to launch containerized pods, functions, and functions-as-a-service instances through execution via compute nodes (515 in arrangement 510), or to separately execute containerized virtualized network functions through execution via compute nodes (523 in arrangement 520). This arrangement is adapted for use of multiple tenants in system arrangement 530 (using compute nodes 536), where containerized pods (e.g., pods 512), functions (e.g., functions 513, VNFs 522, 537), and functions-as-a-service instances (e.g., FaaS instance 514) are launched within virtual machines (e.g., VMs 534, 535 for tenants 532, 533) specific to respective tenants (aside the execution of virtualized network functions). This arrangement is further adapted for use in system arrangement 540, which provides containers 542, 543, or execution of the various functions, applications, and functions on compute nodes 544, as coordinated by an container-based orchestration system 541.

The system arrangements of depicted in FIG. 5 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 5, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

Figure 6:
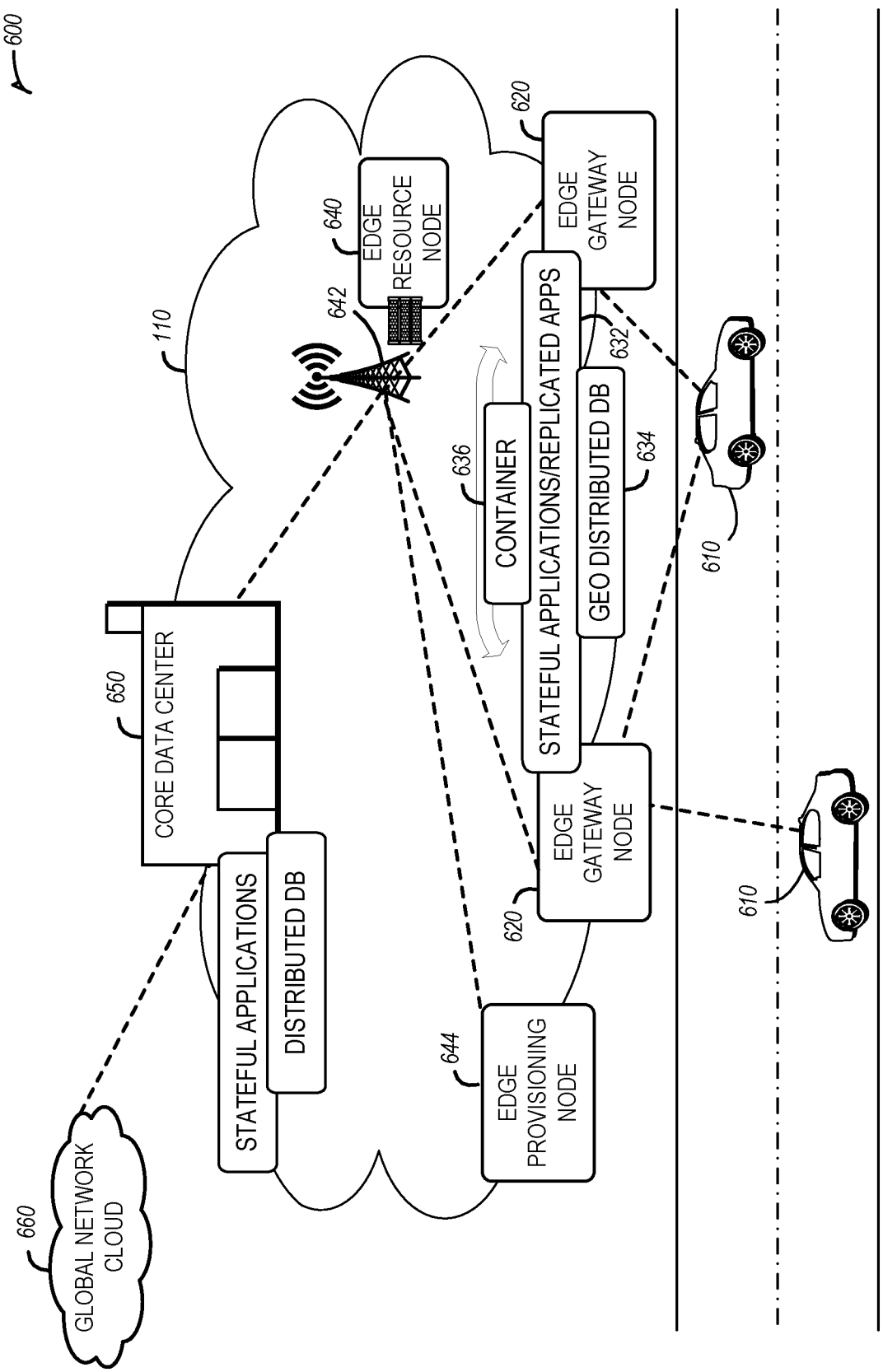
FIG. 6 illustrates a compute and communication use case involving mobile access to applications in an edge computing system.

It should be appreciated that the edge computing systems and arrangements discussed herein may be applicable in various solutions, services, and/or use cases involving mobility. As an example, FIG. 6 shows a simplified vehicle compute and communication use case involving mobile access to applications in an edge computing system 600 that implements an edge cloud 110. In this use case, respective client compute nodes 610 may be embodied as in-vehicle compute systems (e.g., in-vehicle navigation and/or infotainment systems) located in corresponding vehicles which communicate with the edge gateway nodes 620 during traversal of a roadway. For instance, the edge gateway nodes 620 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client compute node 610 and a particular edge gateway device 620 may propagate so as to maintain a consistent connection and context for the client compute node 610. Likewise, mobile edge nodes may aggregate at the high priority services or according to the throughput or latency resolution requirements for the underlying service(s) (e.g., in the case of drones). The respective edge gateway devices 620 include an amount of processing and storage capabilities and, as such, some processing and/or storage of data for the client compute nodes 610 may be performed on one or more of the edge gateway devices 620.

The edge gateway devices 620 may communicate with one or more edge resource nodes 640, which are illustratively embodied as compute servers, appliances or components located at or in a communication base station 642 (e.g., a based station of a cellular network). As discussed above, the respective edge resource nodes 640 include an amount of processing and storage capabilities and, as such, some processing and/or storage of data for the client compute nodes 610 may be performed on the edge resource node 640. For example, the processing of data that is less urgent or important may be performed by the edge resource node 640, while the processing of data that is of a higher urgency or importance may be performed by the edge gateway devices 620 (depending on, for example, the capabilities of each component, or information in the request indicating urgency or importance). Based on data access, data location or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 640 also communicate with the core data center 650, which may include compute servers, appliances, and/or other components located in a central location (e.g., a central office of a cellular communication network). The core data center 650 may provide a gateway to the global network cloud 660 (e.g., the Internet) for the edge cloud 110 operations formed by the edge resource node(s) 640 and the edge gateway devices 620. Additionally, in some examples, the core data center 650 may include an amount of processing and storage capabilities and, as such, some processing and/or storage of data for the client compute devices may be performed on the core data center 650 (e.g., processing of low urgency or importance, or high complexity).

The edge gateway nodes 620 or the edge resource nodes 640 may offer the use of stateful applications 632 and a geographic distributed database 634. Although the applications 632 and database 634 are illustrated as being horizontally distributed at a layer of the edge cloud 110, it will be understood that resources, services, or other components of the application may be vertically distributed throughout the edge cloud (including, part of the application executed at the client compute node 610, other parts at the edge gateway nodes 620 or the edge resource nodes 640, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container 636 (or pod of containers) may be flexibly migrated from an edge node 620 to other edge nodes (e.g., 620, 640, etc.) such that the container with an application and workload does not need to be reconstituted, re-compiled, re-interpreted in order for migration to work. However, in such settings, there may be some remedial or "swizzling" translation operations applied. For example, the physical hardware at node 640 may differ from edge gateway node 620 and therefore, the hardware abstraction layer (HAL) that makes up the bottom edge of the container will be re-mapped to the physical layer of the target edge node. This may involve some form of late-binding technique, such as binary translation of the HAL from the container native format to the physical hardware format, or may involve mapping interfaces and operations. A pod controller may be used to drive the interface mapping as part of the container lifecycle, which includes migration to/from different hardware environments.

The scenarios encompassed by FIG. 6 may utilize various types of mobile edge nodes, such as an edge node hosted in a vehicle (car/truck/tram/train) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 620, some others at the edge resource node 640, and others in the core data center 650 or global network cloud 660.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application which may be provided by a third party) is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 600 can include or be in communication with an edge provisioning node 644. The edge provisioning node 644 can distribute software such as the example computer readable instructions 782 of FIG. 7B, to various receiving parties for implementing any of the methods described herein. The example edge provisioning node 644 may be implemented by any computer server, home server, content delivery network, virtual server, software distribution system, central facility, storage device, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 644 may be located in a cloud, in a local area network, in an edge network, in a wide area network, on the Internet, and/or any other location communicatively coupled with the receiving party(ies). The receiving parties may be customers, clients, associates, users, etc. of the entity owning and/or operating the edge provisioning node 644. For example, the entity that owns and/or operates the edge provisioning node 644 may be a developer, a seller, and/or a licensor (or a customer and/or consumer thereof) of software instructions such as the example computer readable instructions 782 of FIG. 7B. The receiving parties may be consumers, service providers, users, retailers, OEMs, etc., who purchase and/or license the software instructions for use and/or re-sale and/or sub-licensing.

In an example, edge provisioning node 644 includes one or more servers and one or more storage devices. The storage devices host computer readable instructions such as the example computer readable instructions 782 of FIG. 7B, as described below. Similarly to edge gateway devices 620 described above, the one or more servers of the edge provisioning node 644 are in communication with a base station 642 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third party payment entity. The servers enable purchasers and/or licensors to download the computer readable instructions 782 from the edge provisioning node 644. For example, the software instructions, which may correspond to the example computer readable instructions 782 of FIG. 7B, may be downloaded to the example processor platform/s, which is to execute the computer readable instructions 782 to implement the methods described herein.

In some examples, the processor platform(s) that execute the computer readable instructions 782 can be physically located in different geographic locations, legal jurisdictions, etc. In some examples, one or more servers of the edge provisioning node 644 periodically offer, transmit, and/or force updates to the software instructions (e.g., the example computer readable instructions 782 of FIG. 7B) to ensure improvements, patches, updates, etc. are distributed and applied to the software instructions implemented at the end user devices. In some examples, different components of the computer readable instructions 782 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

In further examples, any of the compute nodes or devices discussed with reference to the present edge computing systems and environment may be fulfilled based on the components depicted in FIGS. 7A and 7B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 7A:
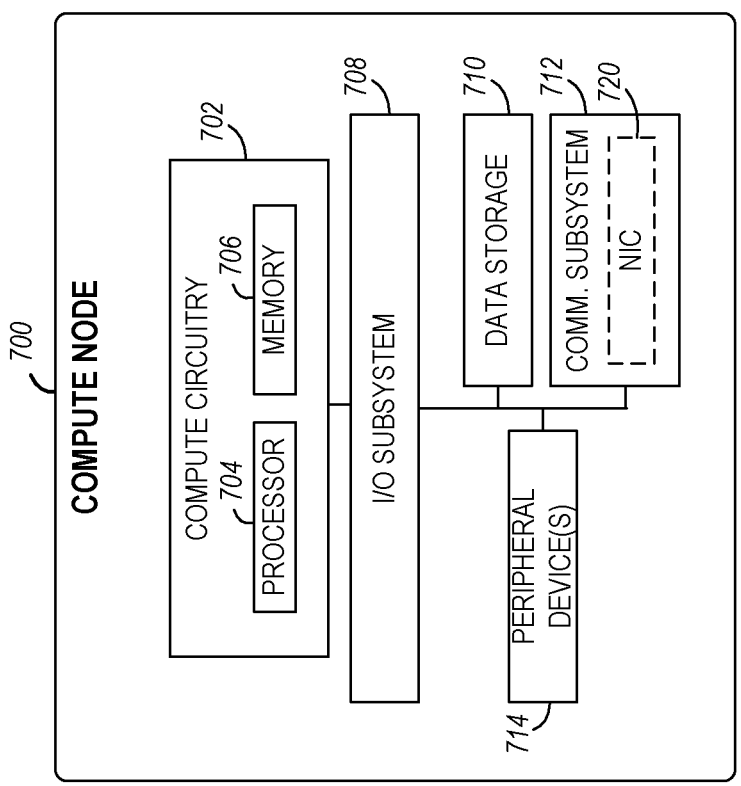
FIG. 7A illustrates an overview of example components for compute deployed at a compute node in an edge computing system.

In the simplified example depicted in FIG. 7A, an edge compute node 700 includes a compute engine (also referred to herein as "compute circuitry") 702, an input/output (I/O) subsystem 708, data storage 710, a communication circuitry subsystem 712, and, optionally, one or more peripheral devices 714. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 700 may be embodied as any type of engine, device, or collection of devices capable of performing various compute functions. In some examples, the compute node 700 may be embodied as a single device such as an integrated circuit, an embedded system, a field-programmable gate array (FPGA), a system-on-a-chip (SOC), or other integrated system or device. In the illustrative example, the compute node 700 includes or is embodied as a processor 704 and a memory 706. The processor 704 may be embodied as any type of processor capable of performing the functions described herein (e.g., executing an application). For example, the processor 704 may be embodied as a multi-core processor(s), a microcontroller, a processing unit, a specialized or special purpose processing unit, or other processor or processing/controlling circuit.

In some examples, the processor 704 may be embodied as, include, or be coupled to an FPGA, an application specific integrated circuit (ASIC), reconfigurable hardware or hardware circuitry, or other specialized hardware to facilitate performance of the functions described herein.

Also in some examples, the processor 704 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 704 may work in coordination with each other to execute many types of operations and instructions within and on behalf of the compute node 700.

The memory 706 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 706 may be integrated into the processor 704. The memory 706 may store various software and data used during operation such as one or more applications, data operated on by the application(s), libraries, and drivers.

The compute circuitry 702 is communicatively coupled to other components of the compute node 700 via the I/O subsystem 708, which may be embodied as circuitry and/or components to facilitate input/output operations with the compute circuitry 702 (e.g., with the processor 704 and/or the main memory 706) and other components of the compute circuitry 702. For example, the I/O subsystem 708 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 708 may form a portion of a system-on-a-chip (SoC) and be incorporated, along with one or more of the processor 704, the memory 706, and other components of the compute circuitry 702, into the compute circuitry 702.

The one or more illustrative data storage devices 710 may be embodied as any type of devices configured or adapted for short-term or long-term storage of data such as, for example, memory devices and circuits, memory cards, hard disk drives, solid-state drives, or other data storage devices. Individual data storage devices 710 may include a system partition that stores data and firmware code for the data storage device 710. Individual data storage devices 710 may also include one or more operating system partitions that store data files and executables for operating systems depending on, for example, the type of compute node 700.

The communication circuitry 712 may be embodied as any communication circuit, device, or collection thereof, capable of enabling communications over a network between the compute circuitry 702 and another compute device (e.g., an edge gateway of an implementing edge computing system). The communication circuitry 712 may be configured or adapted to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LP-WAN) or low-power wide-area (LPWA) protocols, etc.) to effect such communication.

The illustrative communication circuitry 712 includes a network interface controller (NIC) 720, which may also be referred to as a host fabric interface (HFI). The NIC 720 may be embodied as one or more add-in-boards, daughter cards, network interface cards, controller chips, chipsets, or other devices that may be used by the compute node 700 to connect with another compute device (e.g., an edge gateway node). In some examples, the NIC 720 may be embodied as part of a system-on-a-chip (SoC) that includes one or more processors, or included on a multichip package that also contains one or more processors. In some examples, the NIC 720 may include a local processor (not shown) and/or a local memory (not shown) that are both local to the NIC 720. In such examples, the local processor of the NIC 720 may be capable of performing one or more of the functions of the compute circuitry 702 described herein. Additionally, or alternatively, in such examples, the local memory of the NIC 720 may be integrated into one or more components of the client compute node at the board level, socket level, chip level, and/or other levels.

Additionally, in some examples, a respective compute node 700 may include one or more peripheral devices 714. Such peripheral devices 714 may include any type of peripheral device found in a compute device or server such as audio input devices, a display, other input/output devices, interface devices, and/or other peripheral devices, depending on the particular type of the compute node 700. In further examples, the compute node 700 may be embodied by a respective edge compute node (whether a client, gateway, or aggregation node) in an edge computing system or like forms of appliances, computers, subsystems, circuitry, or other components.

Figure 7B:
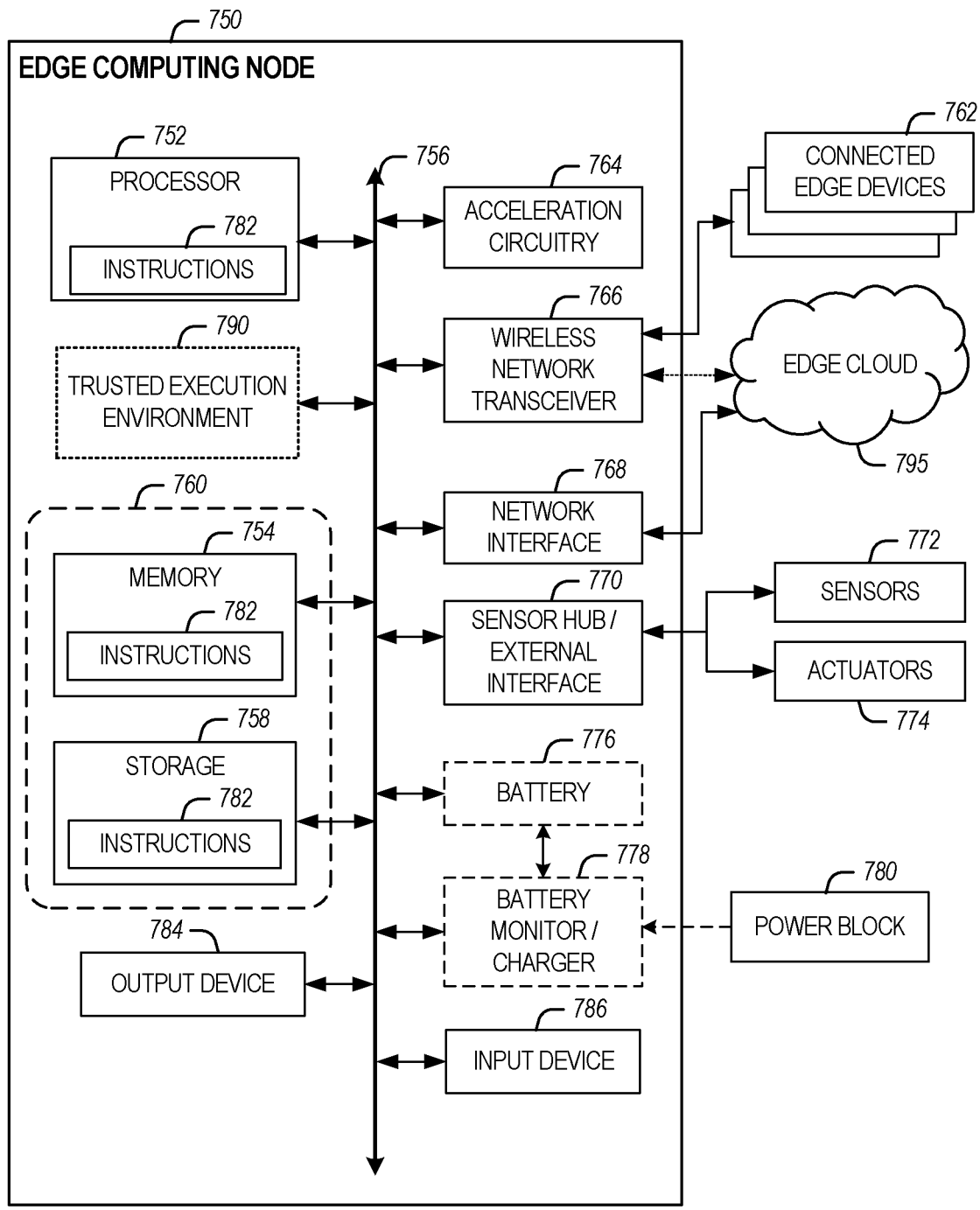
FIG. 7B illustrates a further overview of example components within a computing device in an edge computing system.

In a more detailed example, FIG. 7B illustrates a block diagram of an example of components that may be present in an edge computing node 750 for implementing the techniques (e.g., operations, processes, methods, and methodologies) described herein. This edge computing node 750 provides a closer view of the respective components of node 700 when implemented as or as part of a computing device (e.g., as a mobile device, a base station, server, gateway, etc.). The edge computing node 750 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 750, or as components otherwise incorporated within a chassis of a larger system.

The edge computing node 750 may include processing circuitry in the form of a processor 752, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 752 may be a part of a system on a chip (SoC) in which the processor 752 and other components are formed into a single integrated circuit, or a single package, such as the Edison™ or Galileo™ SoC boards from Intel Corporation, Santa Clara, California. As an example, the processor 752 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 752 and accompanying circuitry may be provided in a single socket form factor, multiple socket form factor, or a variety of other formats, including in limited hardware configurations or configurations that include fewer than all elements shown in FIG. 7B.

The processor 752 may communicate with a system memory 754 over an interconnect 756 (e.g., a bus). Any number of memory devices may be used to provide for a given amount of system memory. As examples, the memory 754 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured or adapted as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 758 may also couple to the processor 752 via the interconnect 756. In an example, the storage 758 may be implemented via a solid-state disk drive (SSDD). Other devices that may be used for the storage 758 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 758 may be on-die memory or registers associated with the processor 752. However, in some examples, the storage 758 may be implemented using a micro hard disk drive (HDD). Further, any number of new technologies may be used for the storage 758 in addition to, or instead of, the technologies described, such resistance change memories, phase change memories, holographic memories, or chemical memories, among others.

The components may communicate over the interconnect 756. The interconnect 756 may include any number of technologies, including industry standard architecture (ISA), extended ISA (EISA), peripheral component interconnect (PCI), peripheral component interconnect extended (PCIx), PCI express (PCIe), or any number of other technologies. The interconnect 756 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 756 may couple the processor 752 to a transceiver 766, for communications with the connected edge devices 762. The transceiver 766 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured or adapted for a particular wireless communication protocol, may be used for the connections to the connected edge devices 762. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 766 (or multiple transceivers) may communicate using multiple standards or radios for communications at a different range. For example, the edge computing node 750 may communicate with close devices, e.g., within about 10 meters, using a local transceiver based on Bluetooth Low Energy (BLE), or another low power radio, to save power. More distant connected edge devices 762, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 766 (e.g., a radio transceiver) may be included to communicate with devices or services in the edge cloud 795 via local or wide area network protocols. The wireless network transceiver 766 may be a low-power wide-area (LPWA) transceiver that follows the IEEE 802.15.4, or IEEE 802.15.4g standards, among others. The edge computing node 750 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 766, as described herein. For example, the transceiver 766 may include a cellular transceiver that uses spread spectrum (SPA/SAS) communications for implementing high-speed communications. Further, any number of other protocols may be used, such as Wi-Fi® networks for medium speed communications and provision of network communications. The transceiver 766 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 768 may be included to provide a wired communication to nodes of the edge cloud 795 or to other devices, such as the connected edge devices 762 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 768 may be included to enable connecting to a second network, for example, a first NIC 768 providing communications to the cloud over Ethernet, and a second NIC 768 providing communications to other devices over another type of network.

Given the variety of types of applicable communications from the device to another component or network, applicable communications circuitry used by the device may include or be embodied by any one or more of components 764, 766, 768, or 770. Accordingly, in various examples, applicable means for communicating (e.g., receiving, transmitting, etc.) may be embodied by such communications circuitry.

The edge computing node 750 may include or be coupled to acceleration circuitry 764, which may be embodied by one or more artificial intelligence (AI) accelerators, a neural compute stick, neuromorphic hardware, an FPGA, an arrangement of GPUs, an arrangement of xPUs/DPUs/IPU/ NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 756 may couple the processor 752 to a sensor hub or external interface 770 that is used to connect additional devices or subsystems. The devices may include sensors 772, such as accelerometers, level sensors, flow sensors, optical light sensors, camera sensors, temperature sensors, global navigation system (e.g., GPS) sensors, pressure sensors, barometric pressure sensors, and the like. The hub or interface 770 further may be used to connect the edge computing node 750 to actuators 774, such as power switches, valve actuators, an audible sound generator, a visual warning device, and the like.

In some optional examples, various input/output (I/O) devices may be present within or connected to, the edge computing node 750. For example, a display or other output device 784 may be included to show information, such as sensor readings or actuator position. An input device 786, such as a touch screen or keypad may be included to accept input. An output device 784 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 750. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 776 may power the edge computing node 750, although, in examples in which the edge computing node 750 is mounted in a fixed location, it may have a power supply coupled to an electrical grid, or the battery may be used as a backup or for temporary capabilities. The battery 776 may be a lithium ion battery, or a metal-air battery, such as a zinc-air battery, an aluminum-air battery, a lithium-air battery, and the like.

A battery monitor/charger 778 may be included in the edge computing node 750 to track the state of charge (SoCh) of the battery 776, if included. The battery monitor/charger 778 may be used to monitor other parameters of the battery 776 to provide failure predictions, such as the state of health (SoH) and the state of function (SoF) of the battery 776. The battery monitor/charger 778 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 778 may communicate the information on the battery 776 to the processor 752 over the interconnect 756. The battery monitor/charger 778 may also include an analog-to-digital (ADC) converter that enables the processor 752 to directly monitor the voltage of the battery 776 or the current flow from the battery 776. The battery parameters may be used to determine actions that the edge computing node 750 may perform, such as transmission frequency, mesh network operation, sensing frequency, and the like.

A power block 780, or other power supply coupled to a grid, may be coupled with the battery monitor/charger 778 to charge the battery 776. In some examples, the power block 780 may be replaced with a wireless power receiver to obtain the power wirelessly, for example, through a loop antenna in the edge computing node 750. A wireless battery charging circuit, such as an LTC4020 chip from Linear Technologies of Milpitas, California, among others, may be included in the battery monitor/charger 778. The specific charging circuits may be selected based on the size of the battery 776, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 758 may include instructions 782 in the form of software, firmware, or hardware commands to implement the techniques described herein. Although such instructions 782 are shown as code blocks included in the memory 754 and the storage 758, it may be understood that any of the code blocks may be replaced with hardwired circuits, for example, built into an application specific integrated circuit (ASIC).

In an example, the instructions 782 provided via the memory 754, the storage 758, or the processor 752 may be embodied as a non-transitory, machine-readable medium 760 including code to direct the processor 752 to perform electronic operations in the edge computing node 750. The processor 752 may access the non-transitory, machine-readable medium 760 over the interconnect 756. For instance, the non-transitory, machine-readable medium 760 may be embodied by devices described for the storage 758 or may include specific storage units such as optical disks, flash drives, or any number of other hardware devices. The non-transitory, machine-readable medium 760 may include instructions to direct the processor 752 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 782 on the processor 752 (separately, or in combination with the instructions 782 of the machine readable medium 760) may configure or instantiate execution or operation of a trusted execution environment (TEE) 790. In an example, the TEE 790 operates as a protected area accessible to the processor 752 for secure execution of instructions and secure access to data. Various implementations of the TEE 790, and an accompanying secure area in the processor 752 or the memory 754 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 750 through the TEE 790 and the processor 752.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Figure 7C:
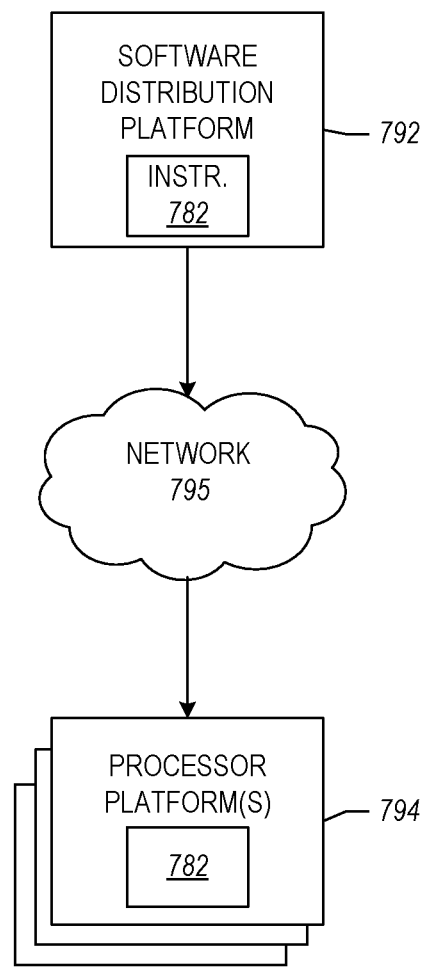
FIG. 7C illustrates an example software distribution platform in an edge computing system.

FIG. 7C illustrates an example software distribution platform 792 to distribute software, such as the example computer readable instructions 782 of FIG. 7B, to one or more devices, such as example processor platform(s) 794 and/or example connected edge devices 762. The example software distribution platform 792 may be implemented by any computer server, data facility, cloud service, etc., capable of storing and transmitting software to other computing devices (e.g., third parties, the example connected Edge devices 762 of FIG. 7B). Example connected edge devices may be customers, clients, managing devices (e.g., servers), third parties (e.g., customers of an entity owning and/or operating the software distribution platform 792). Example connected Edge devices may operate in commercial and/or home automation environments. In some examples, a third party is a developer, a seller, and/or a licensor of software such as the example computer readable instructions 782 of FIG. 7B. The third parties may be consumers, users, retailers, OEMs, etc., that purchase and/or license the software for use and/or re-sale and/or sub-licensing. In some examples, distributed software causes display of one or more user interfaces (UIs) and/or graphical user interfaces (GUIs) to identify the one or more devices (e.g., connected Edge devices) geographically and/or logically separated from each other (e.g., physically separated IoT devices chartered with the responsibility of water distribution control (e.g., pumps), electricity distribution control (e.g., relays), etc.).

In the illustrated example of FIG. 7C, the software distribution platform 792 includes one or more servers and one or more storage devices. The storage devices store the computer readable instructions 782, which may correspond to the example computer readable instructions of FIG. 7B, as described above. The one or more servers of the example software distribution platform 792 are in communication with a network 795, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or via a third-party payment entity. The servers enable purchasers and/or licensors to download the computer readable instructions 782 from the software distribution platform 792. For example, the software, which may correspond to the example computer readable instructions 782 of FIG. 7B, may be downloaded to the example processor platform(s) 792 (e.g., example connected Edge devices), which is/are to execute the computer readable instructions 782 to implement the transformation monitoring and response techniques discussed herein. In some examples, one or more servers of the software distribution platform 792 are communicatively connected to one or more security domains and/or security devices through which requests and transmissions of the example computer readable instructions 782 must pass. In some examples, one or more servers of the software distribution platform 792 periodically offer, transmit, and/or force updates to the software (e.g., the example computer readable instructions 782 of FIG. 7B) to ensure improvements, patches, updates, etc., are distributed and applied to the software at the end user devices.

In the illustrated example of FIG. 7C, the computer readable instructions 782 are stored on storage devices of the software distribution platform 792 in a particular format. A format of computer readable instructions includes, but is not limited to a particular code language (e.g., Java, JavaScript, Python, C, C #, SQL, HTML, etc.), and/or a particular code state (e.g., uncompiled code (e.g., ASCII), interpreted code, linked code, executable code (e.g., a binary), etc.). In some examples, the computer readable instructions 782 stored in the software distribution platform 792 are in a first format when transmitted to the example processor platform(s) 794. In some examples, the first format is an executable binary in which particular types of the processor platform(s) 794 can execute. However, in some examples, the first format is uncompiled code that requires one or more preparation tasks to transform the first format to a second format to enable execution on the example processor platform(s) 794. For instance, the receiving processor platform(s) 794 may need to compile the computer readable instructions 782 in the first format to generate executable code in a second format that is capable of being executed on the processor platform(s)

794. In still other examples, the first format is interpreted code that, upon reaching the processor platform(s) 794, is interpreted by an interpreter to facilitate execution of instructions.

As will be understood from the preceding overview, a variety of types of use cases for edge and cloud computing may deploy a Service Mesh. One type of Service Mesh which is currently in the process of being developed (and expected to be widely deployed) by Comms Service Providers (CoSP), Telecom equipment manufacturers (TEMS), Virtual Mobile Operators (MNO, MVNOs), and Cloud Service Providers (CSPs) is a 5G Service Based Architecture (SBA). The transformation from 4G to 5G is occurring with extensive use of CPUs and software services, and more importantly, on Cloud Native and Service Mesh software architectures.

Within current 4G networks, network perimeter security may be relied upon since network services are all located directly within the network Core. 5G deployments will involve many services being located among Core to Edge to Cloud—meaning the sensitive telecom security control plane functions (like Charging and Billing, Session Mediation, Authentication, Security Monitoring, etc.) can be deployed on any platform in any hosted environment (Edge, Cloud, Core, Central Office, etc.). Thus, within a 5G service architecture core, such functions are distributed widely among different services, causing network perimeter security to be insufficient. New security exposures are further complicated in a 5G setting due to microservices, multiple vendors, multi-tenancy, open web-based APIs, highly distributed user plane, and multi-domain deployments. One breach in the Service Mesh will make the entire network vulnerable. Thus, securing the Service Mesh security keys used in communications between services and functions is a critical step in protecting the overall operation of a 5G network.

Figure 8:
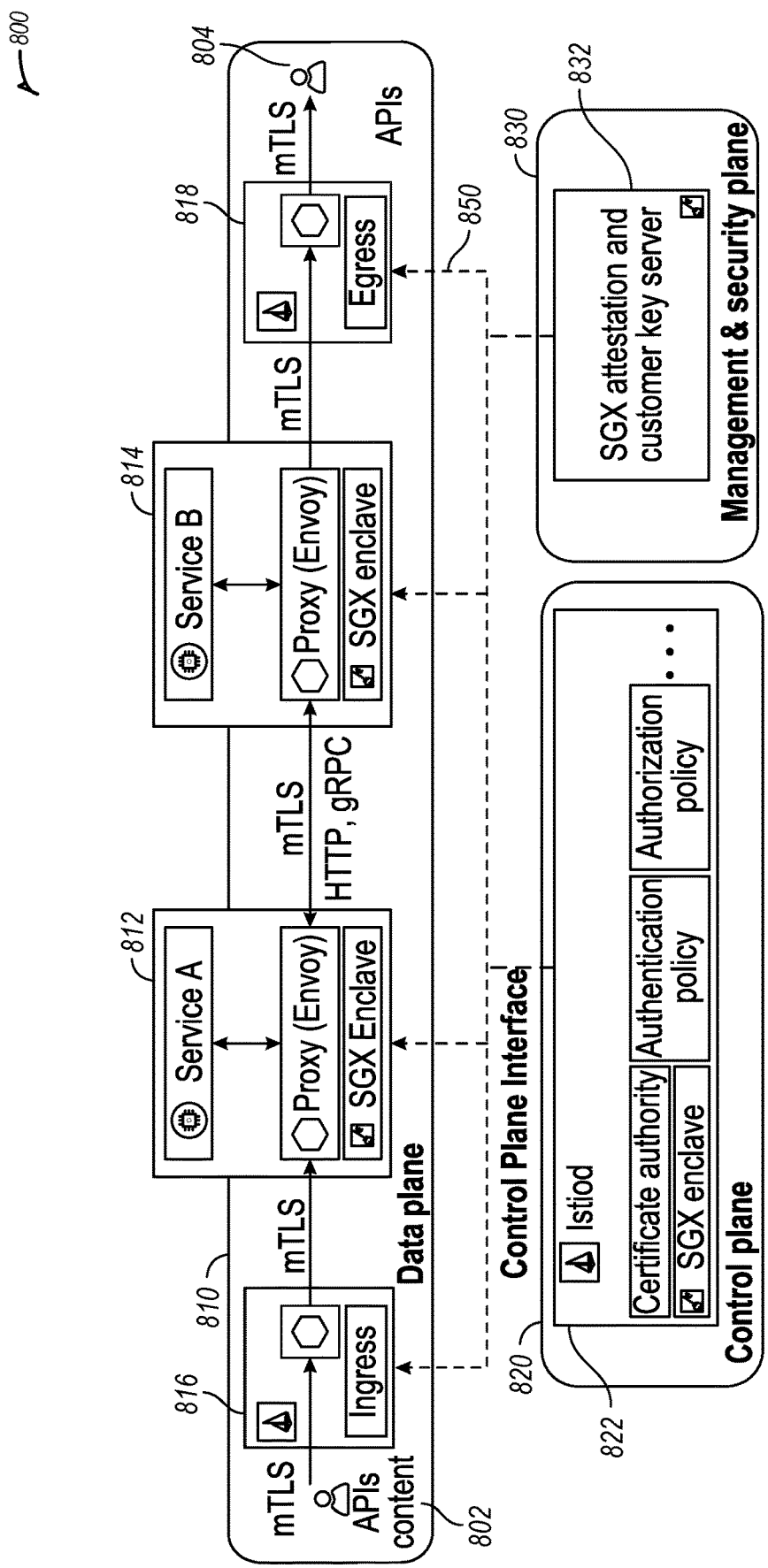
FIG. 8 illustrates an architecture for Cloud Native Service Mesh Secure Key Management, with an implementation of a confidential computing technology, according to an example.

FIG. 8 depicts an architecture 800 for Cloud Native Service Mesh Secure Key Management with an implementation of a confidential computing technology. Specifically, this and the following figures refer to example implementations of Intel® SGX (with SGX enclaves), but it will be understood that other confidential computing technologies (e.g., AMD® SEV, ARM® CCA, etc.) may be substituted. Use of the confidential compute technology enables secure information such as customer private keys & security credentials (collectively called keys) to be securely delivered to confidential data stores (e.g., SGX Enclaves) associated with each service. Therefore, keys are protected in use and at rest.

In the environment of FIG. 8, a data plane 810 is separate from a control plane 820 and a management and security plane 830. These planes are connected to one another using a control plane interface 850. For instance, the control plane 820 may include a Service Mesh manager such as an Istiod kernel 822 (a binary) to operate the control plane 820 for the Service Mesh, to provide control and functional aspects such as a certificate authority, authentication policy, authorization policy, etc. The Istiod kernel 822 may also include a secure enclave or data store (e.g., SGX enclave) used to maintain secure data, as discussed in the following examples. The management and security plane 830 includes a key server 832 (e.g., a SGX attestation and customer key server) used to provide attestation functions and operate key generation for the Service Mesh.

The data plane 820 may include a variety of entities, such as service hosts 812, 814 which communicate with each other using mTLS communications between a respective proxy (e.g., Envoy proxy) at each service host. The data plane 820 may facilitate a number of data transactions, such as the transactions used end-to-end between an API content host 802 (e.g., exposed with an Istiod instance 816) and external APIs 804 (e.g., operated with an Istiod instance 818). For instance, the data plane may operate various types of 5G services and features.

In the environment of FIG. 8, important key management use cases may include: (1) CA Signing (discussed with reference to FIGS. 10 to 15) and (2) mTLS Private Key security (discussed with reference to FIGS. 16 to 18). Thus, keys obtained from a CA at the control plane 820 may be securely generated and distributed in the Service Mesh (e.g., among services and service hosts in the data plane 810); and likewise, keys used in individual mTLS sessions (e.g., between service hosts 812, 814 and proxy instances) may be securely created and maintained and used within communications of the Service Mesh.

Figure 9:
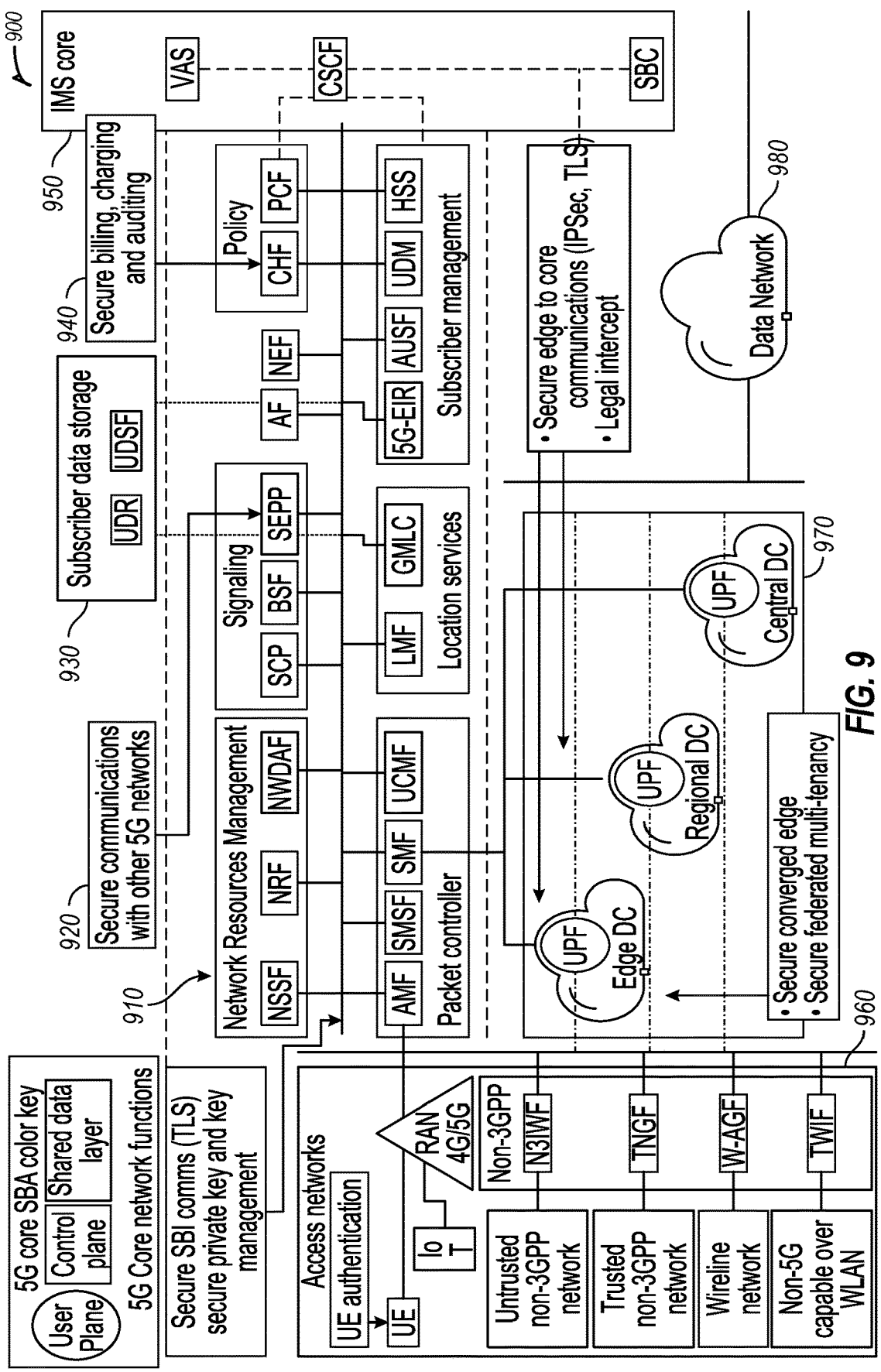
FIG. 9 illustrates a 5G Service Mesh-based Control Plane Security implementation, with an implementation of a confidential computing technology, according to an example.

As will be understood, use of a hardware security-enhanced Service Mesh may enable a variety of implementation benefits for 5G settings. FIG. 9 depicts a 5G Service Mesh-based control plane security implementation 900, adaptable with an implementation of a confidential computing technology as discussed herein. As shown in FIG. 9, the 5G control plane 910 is being deployed as a Service Mesh as part of a number of 5G Core Network functions. Such a hardware-based security solution may be particularly applicable to telecommunication providers (CoSPs). CoSPs are looking to deploy Service Meshes as an "infrastructure service", meaning that CoSPs will manage this layer alongside the confidential computing technology on their hardware platforms in their Core Network. In this setting, aspects of Service Mesh security may be extended for deployments spanning the Edge, Central Offices and the Cloud.

In the environment of FIG. 9, the core network functions may interface with a number of features such as: secure communications with other 5G networks 920; subscriber data storage 930; secure billing, charging, and auditing functions 940; an IP Multimedia Core Network Subsystem (IMS) core 950; access networks 960; data centers 970 (e.g., edge data centers, regional data centers, central data centers), and associated data networks 980. In any of these settings, the management of security for keys used in the Service Mesh may be an important factor to ensure correct and safe operation.

Although FIG. 9 depicts an implementation relevant to telecommunication services, the present Service Mesh security techniques are not limited to 5G or Telco implementations. The present techniques may be used for establishing communications within a 5G Control Plane, or by any service (e.g., Networking Secure Access Service Edge (SASE) services) as well. In fact, a large number of cloud service providers, independent software vendors (ISVs) and networking customers are deploying a "Cloud Native" Service Mesh, or similar extensions of a Service Mesh for coordinated services and functions in cloud-like or edge computing system settings. Thus, it will be understood that the present security techniques may be applicable to a variety of deployment types and use cases in Cloud Native Service Meshes and in Service Meshes which are not necessarily involved in 5G or network management services.

Figure 10:
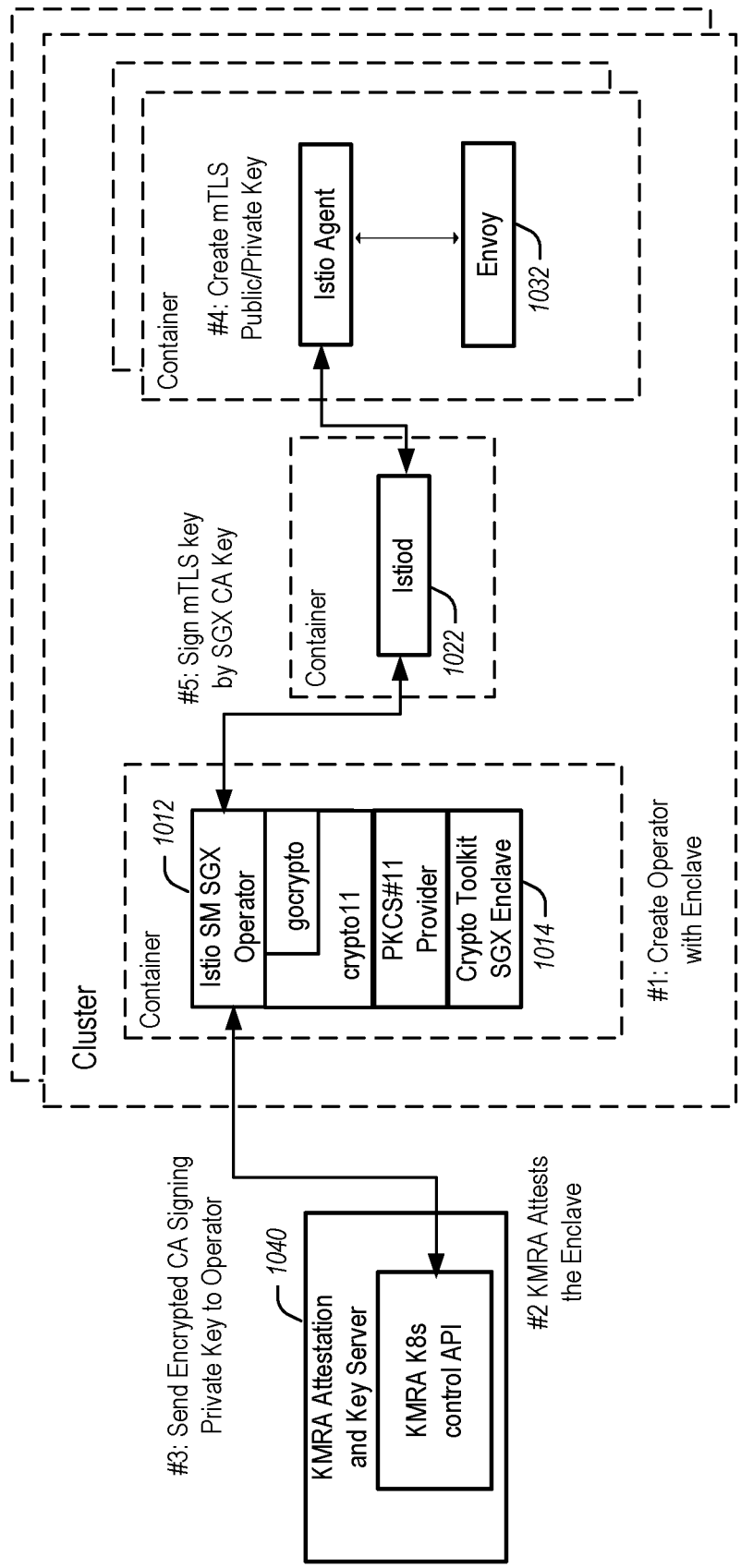
FIG. 10 illustrates an architecture design and operations for Service Mesh Certificate Authority (CA) Signing Key Protection, according to an example.

A first detailed use case of the present security techniques is provided with reference to Service Mesh Signing Key Protection for mTLS secure communications. Protection of Signing Keys is important to ensure that the trust is rooted in the overall system. The generation of Service Mesh signing key may include use of Rivest-Shamir-Adleman (RSA) and/or Elliptic Curve (EC) algorithms, such as are used for signing the mTLS public private keys generated by an intermediate proxy such as an Istio-Agent. The key signing the mTLS keys essentially provides the foundation for trust across multiple service mesh Containers. These Containers are widely distributed in deployment, and can be deployed in multiple configurations. (One such configuration is depicted in FIG. 10, discussed below). In an example, the trust in the Signing Container is established using an Attestation process (e.g., an Intel® SGX's Enclave Attestation process), where the CPU signs the customer's enclave with a CPU hardware rooted private keys. There may be a single Signing Container running the secure enclave per Kubernetes Cluster, or multiple Signing Containers.

FIG. 10 depicts an architecture design 1000 and operations for Service Mesh CA Signing Key Protection. In this figure, Envoy 1032 uses Istiod 1022 and an Istio Service Mesh secure operator 1012 for mTLS key signing, creating trust between the network functions and applications within the Service Mesh. The operations depicted in FIG. 10 include the following sequence:

1) Create operator with an enclave 1014 (e.g., a SGX enclave);
2) A Key Management Reference Application (KMRA) attests the enclave 1014;
3) Send encrypted CA signing private key to the Service Mesh secure operator 1012;
4) Create mTLS public and private keys (e.g., with Envoy 1032);
5) Sign mTLS key using the CA Key (e.g., with Istiod 1022).

Figure 11:
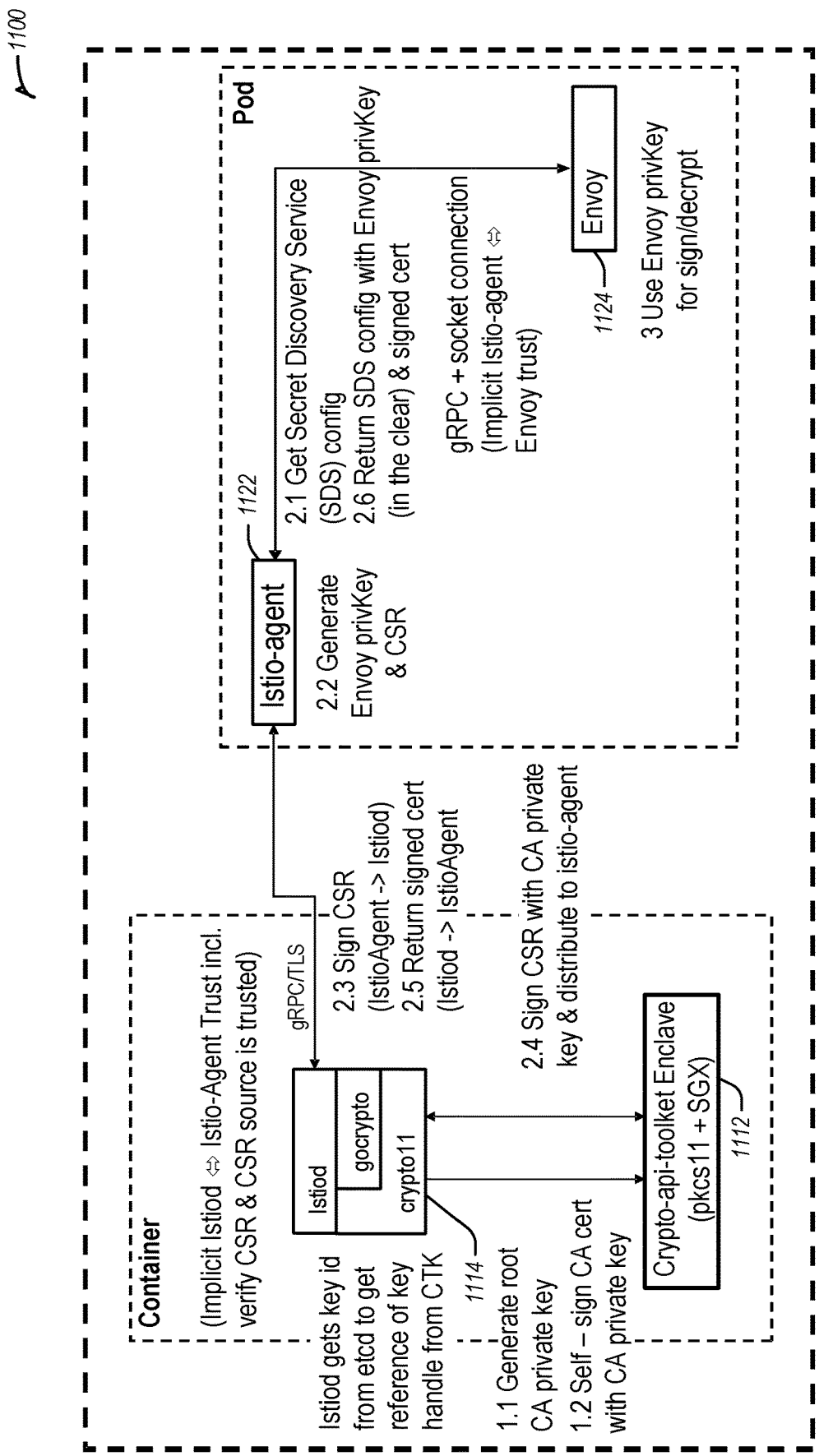
FIG. 11 illustrates an architecture design and operations for protecting a CA self-signed private key in an enclave without attestation, according to an example.

FIG. 11 depicts an architecture design 1100 and operations for protecting a CA self-signed private key in the secure enclave (SGX enclave) without SGX attestation. Here, a new SGX operator is deployed which is used for signing the mTLS public private keys. In this example, Istiod obtains the key id from etcd to get a reference of a key handle from CTK (crypto toolkit enclave). The operations depicted in FIG. 11 include:

1.1) Generate root CA private key (with enclave 1112)
1.2) Self-sign CA cert with CA private key (with enclave 1112)
2.1) Get Secret Discovery Service (SDS) config (between Istio-agent 1122 and Envoy 1124)
2.2) Generate Envoy privKey and certificate signing request (CSR) (not in SGX) (between Istio-agent 1122 and Envoy 1124)
2.3) Sign CSR (Istio-agent 1122→Istiod 1114)
2.4) Sign CSR with CA private key (with enclave 1112) and distribute to Istio-agent 1122
2.5) Return signed cert (Istiod 1114→Istio-agent 1122)

Figure 12:
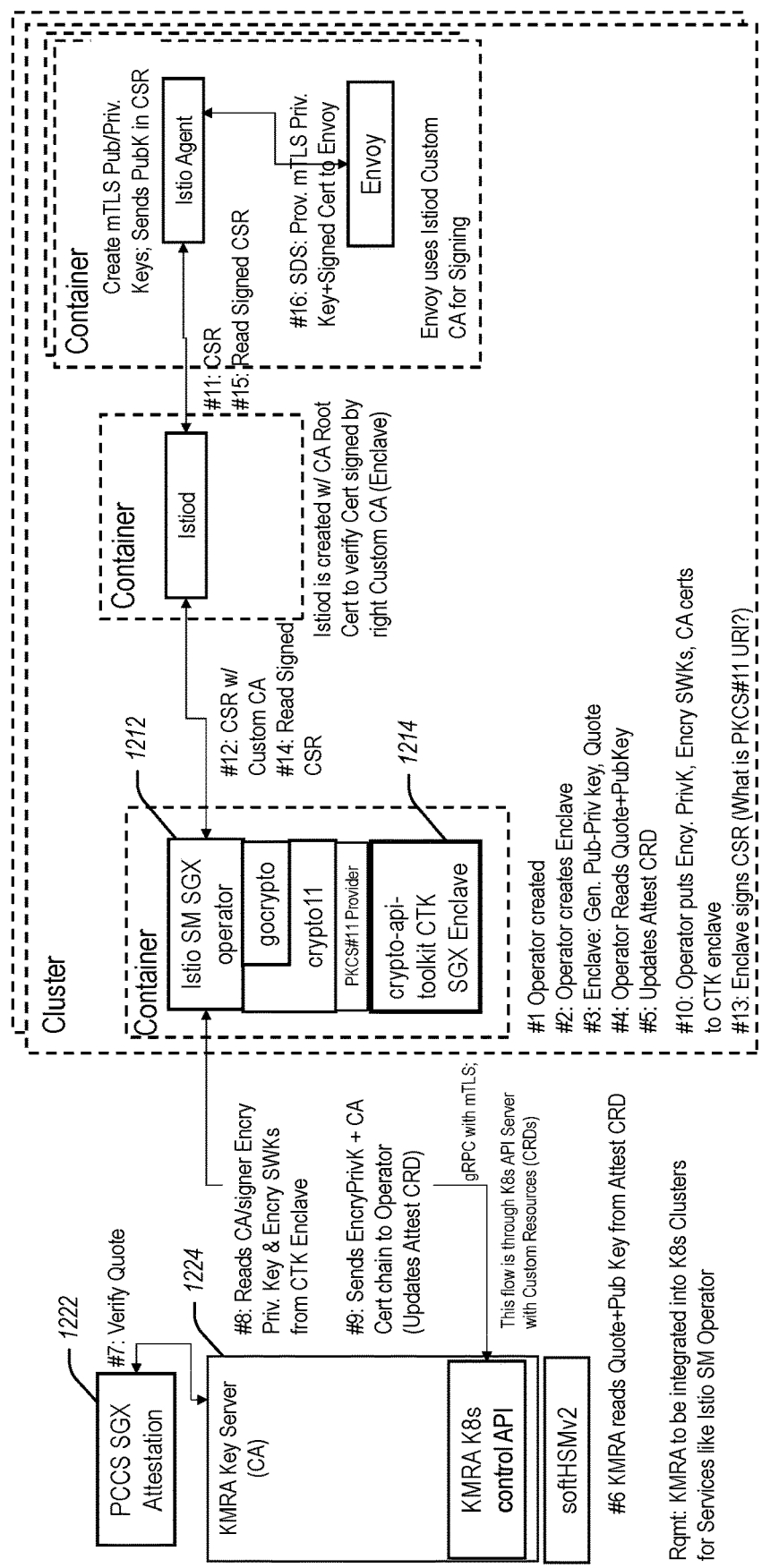
FIG. 12 illustrates an architecture and operations where a confidential computing operator is developed, according to an example.

FIG. 12 depicts an architecture design 1200 and operations where a new service mesh secure operator 1212 (SGX operator) is deployed. This operator 1212 is used for signing the mTLS public private keys. The trust in this operator 1212 is rooted in the Key Management Reference Application (KMRA) Attestation and Key Servers 1222, 1224, which are responsible for verifying the Intel CPU's signed SGX enclave quote.

Upon successful verification of the Quote, the Key Server trust is established in the Operator enclave and the Key Server 1224 securely provisions the Signing private key inside the Operator Enclave 1214. The secure key wrap operations include:

1) The Quote contains a newly generated public key portion (K-pub) of the Public-Private RSA key generated by the Operator Enclave 1214 at startup.
2) The KMRA 1224 verifies the Quote and then associates the attached Public Key hash (K-pub-hash) with the enclave's public key (K-pub).
3) The KMRA 1224 uses a digital random number generator to create a new symmetric key, such as a 256-bit AES encryption key (EncK).
4) The KMRA 1224 encrypts the mTLS signing private key (Km-Priv) with EncK, and then wraps the EncK with the K-pub, which is obtained in the enclave quote.

These encrypted keys can then be delivered into the enclave using a TLS session. TLS is not required but is a good security practice.

Figure 13:
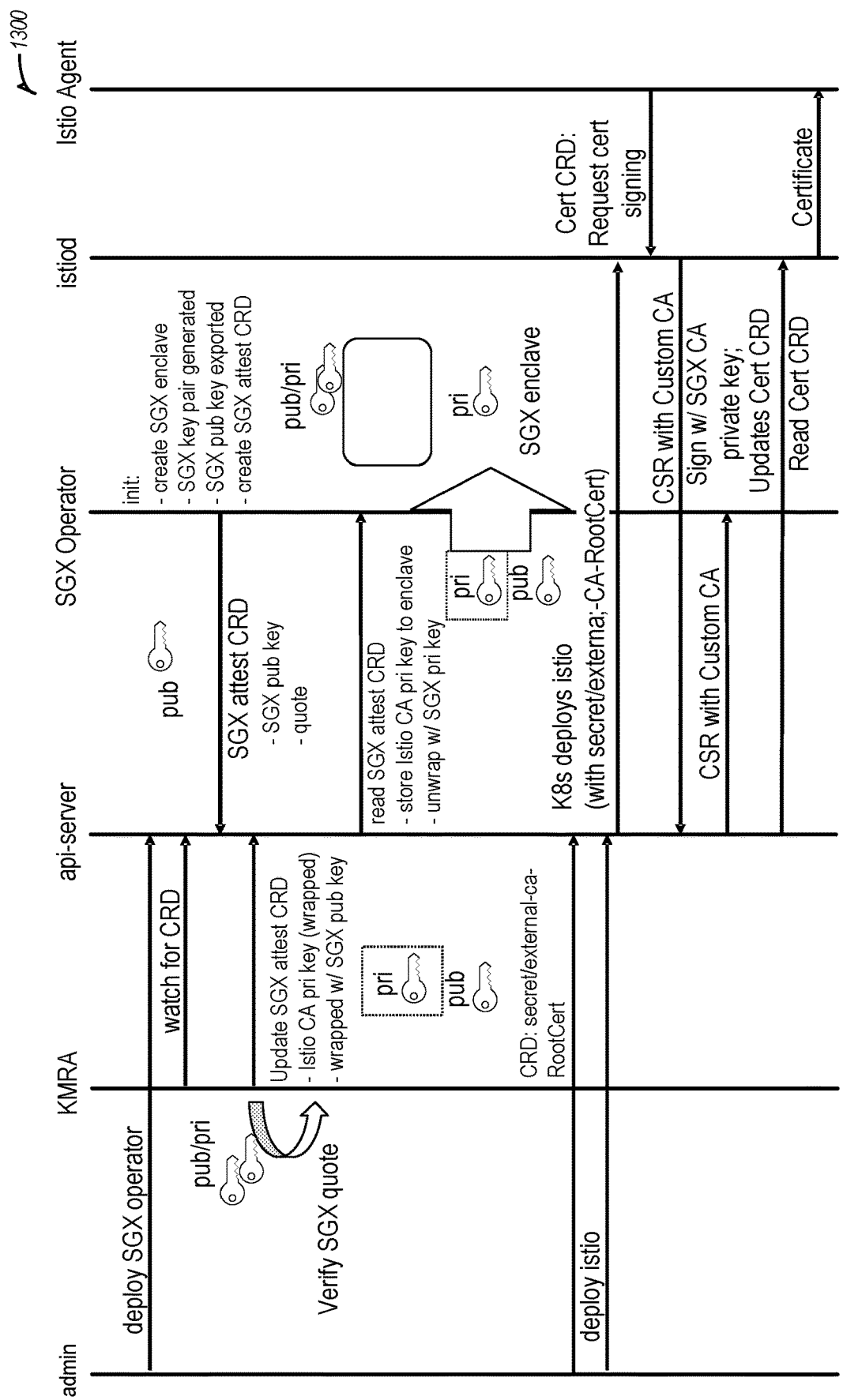
FIG. 13 illustrates Service Mesh CA Signing Key Protection with a Custom CA, according to an example.

FIG. 13 depicts a sequence 1300 for Service Mesh CA Signing Key Protection with SGX Custom Certificate Authority (CA). In this illustration, details of Kubernetes flows are depicted, which can be implemented to enable the SGX Operator-based Key Signing.

Figure 14:
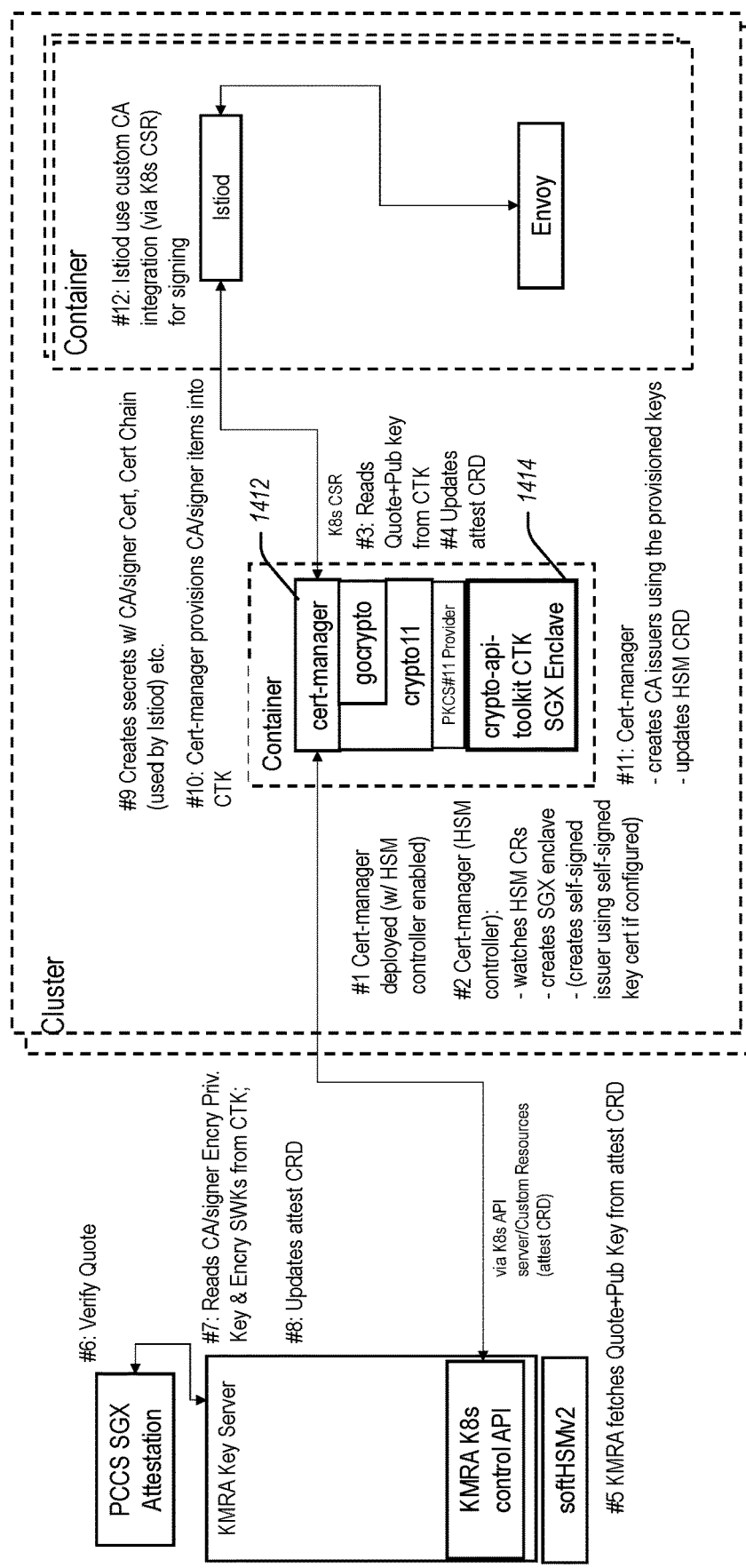
FIG. 14 illustrates an extension of a Kubernetes Cert-Manager with confidential computing protections, according to an example.

FIG. 14 depicts another architecture design 1400 that extends the Kubernetes Cert-Manager with Intel® SGX confidential computing. In one example, a Cert-Manager 1412 can use an Intel® SGX crypto-toolkit 1414 to secure provision the mTLS Signing Keys. This design 1400 can use the steps described above (e.g., with reference to FIGS. 10 to 13) for secure key provisioning.

Figure 15:
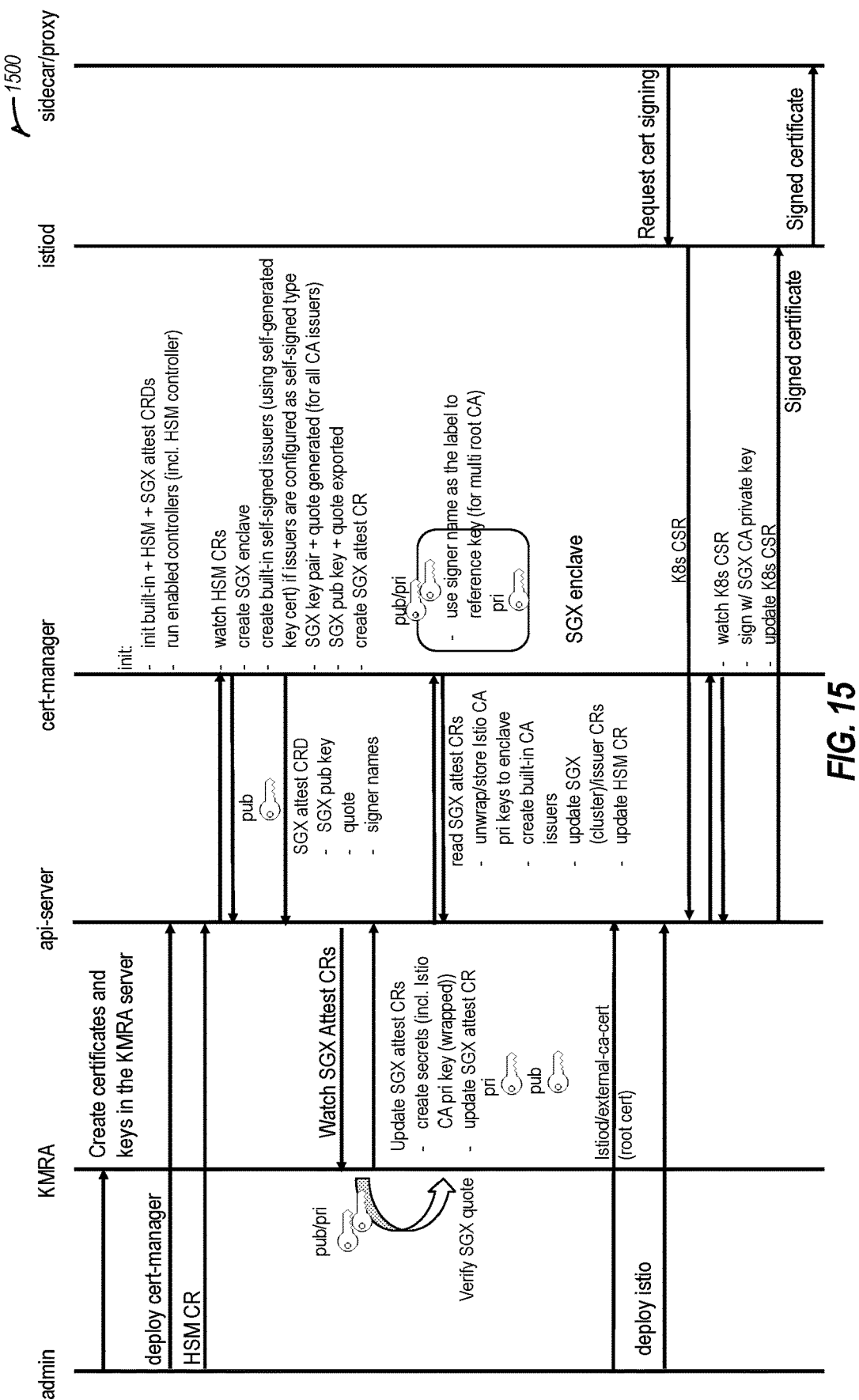
FIG. 15 illustrates Service Mesh CA Signing Key Protection with a Certificate Manager, according to an example.

FIG. 15 depicts a sequence 1500 for Service Mesh CA Signing Key Protection with a Certificate Manager (specifically, a SGX certificate manager). In this illustration, additional details of Kubernetes flows are depicted, using the same or similar operations as described above for secure key provisioning. Here, the notion of Kubernetes CRDs can be extended to include Confidential Computing constructs, for instance, using Attestation and Key wrap extensions to enable a confidential computing system to use Kubernetes APIs seamlessly.

Figure 16:
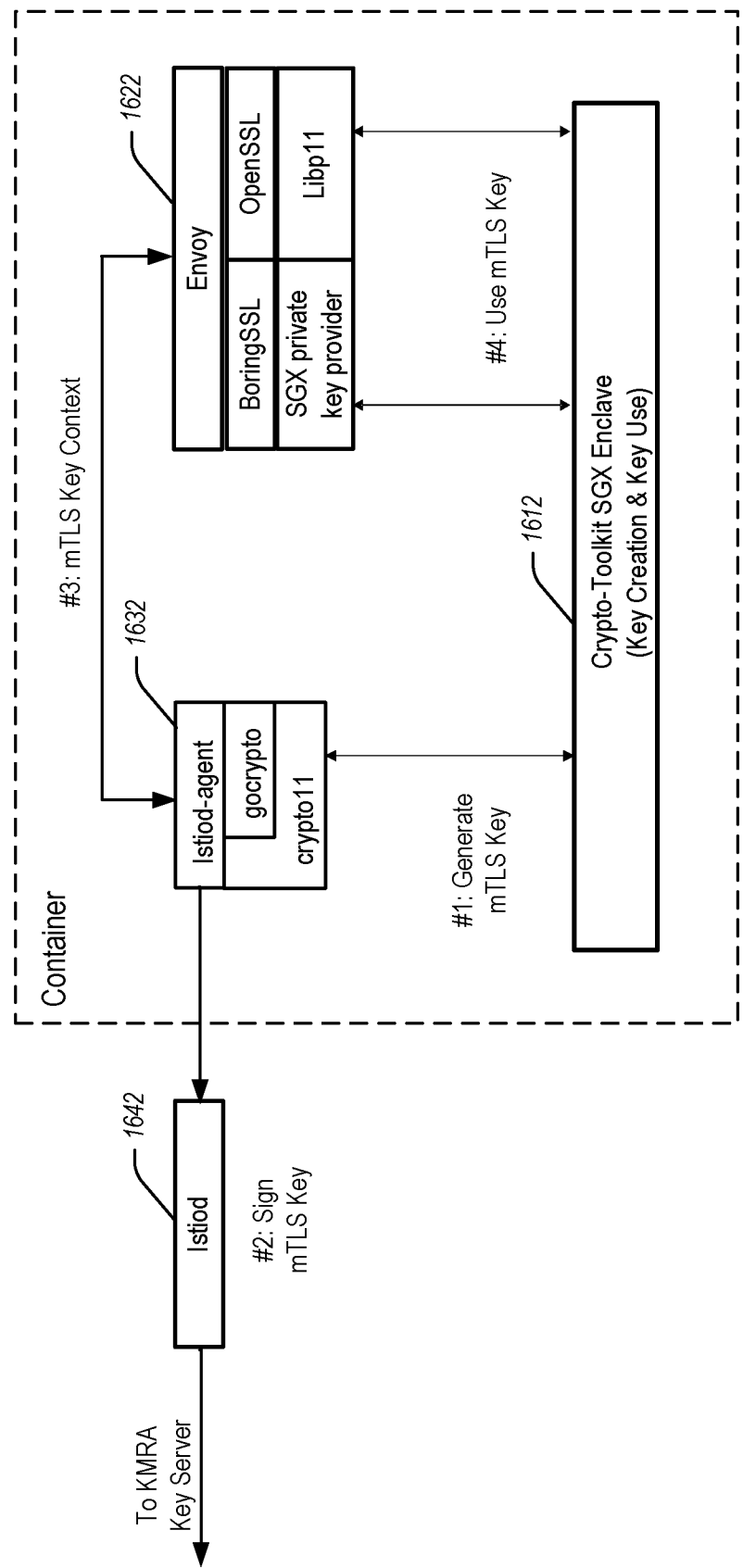
FIG. 16 illustrates Service Mesh Mutual TLS (mTLS) Key Generation and mTLS Key Protection with a confidential computing architecture, according to an example.
Figure 17A:
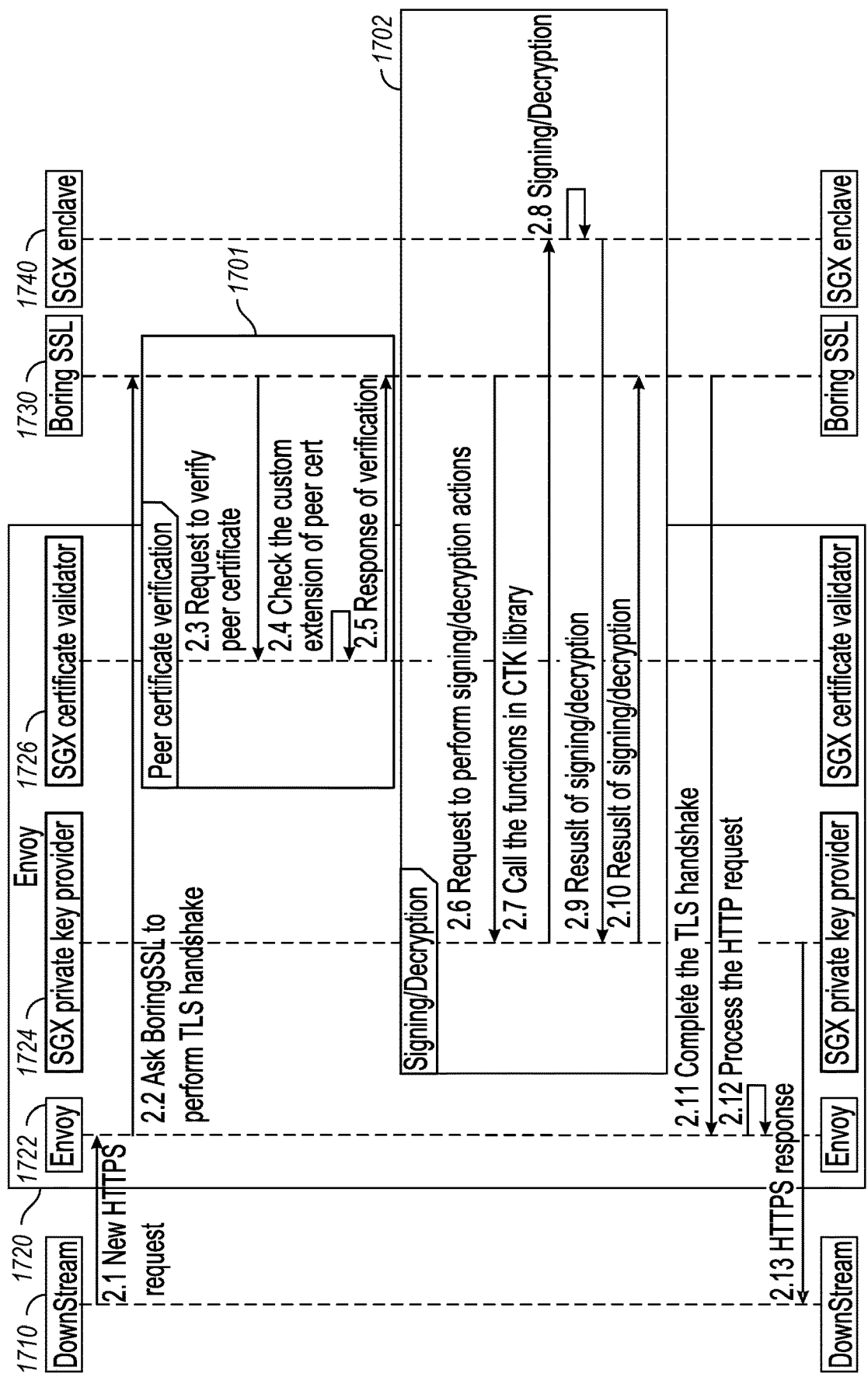
FIGS. 17A to 17D illustrate sequential operations for Service Mesh mTLS Key Generation and mTLS Key Protection with a confidential computing architecture, within data plane, control plane, and attestation service operations, according to an example.
Figure 17B:
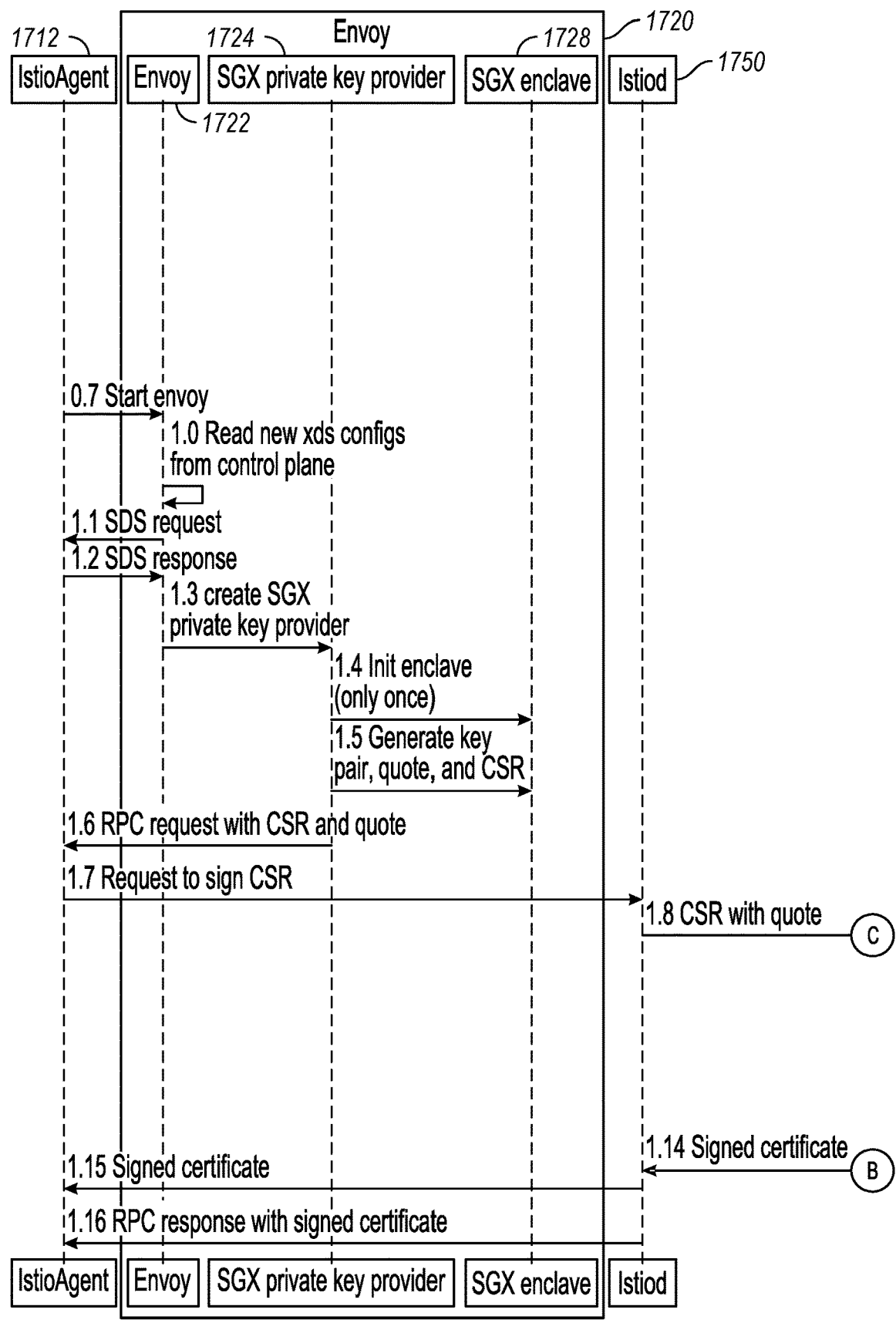
Figure 17C:
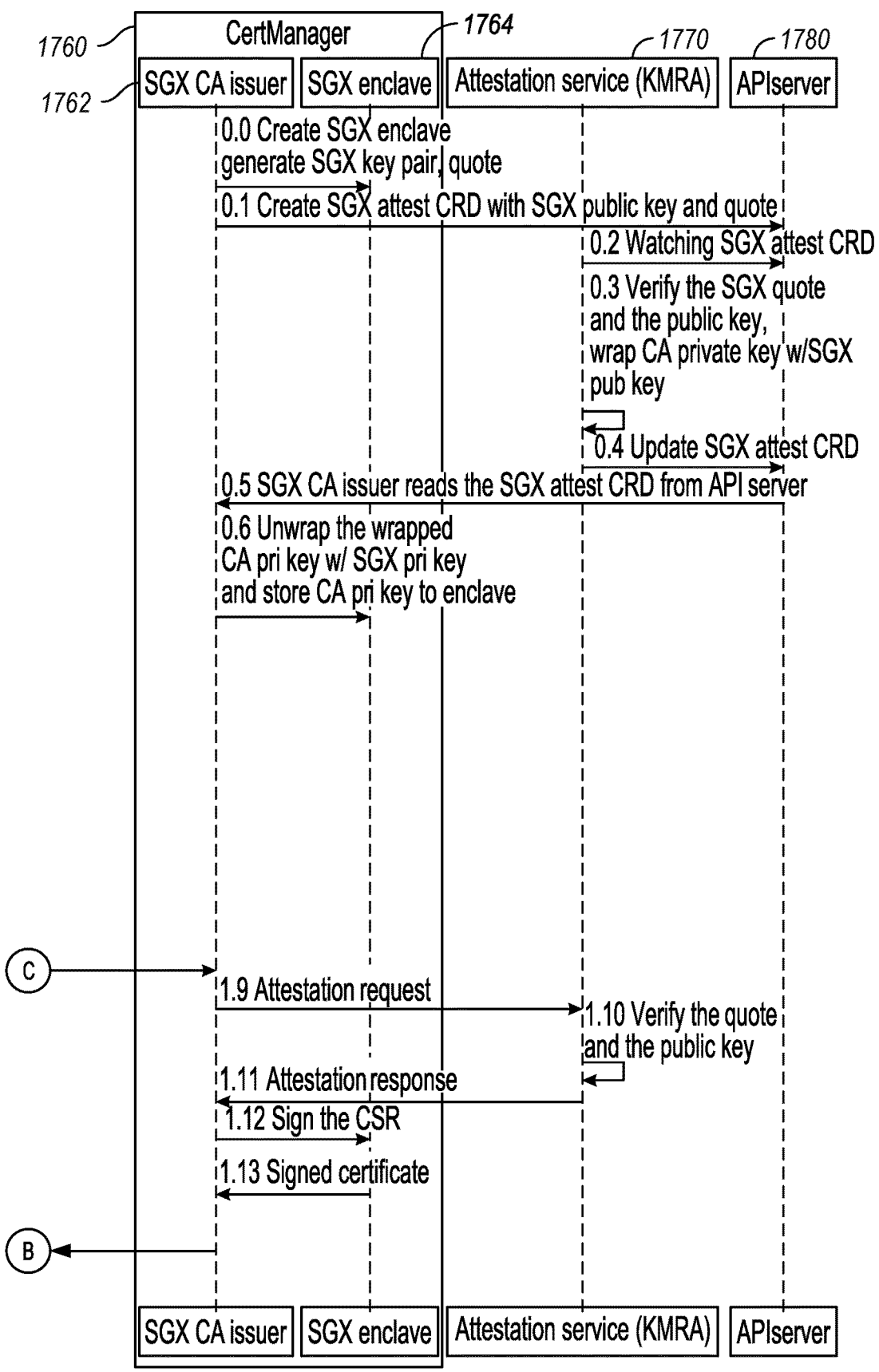
Figure 17D:
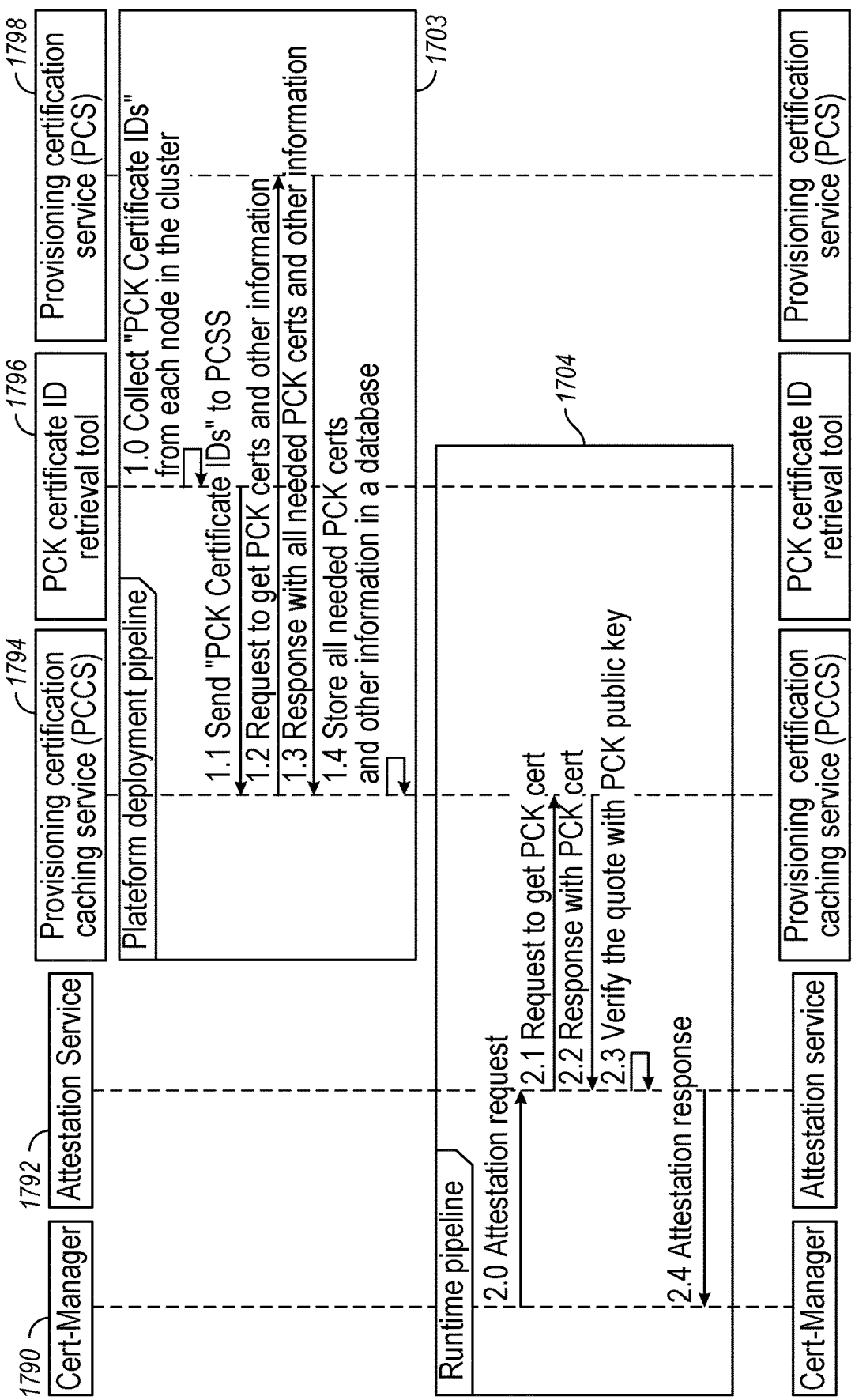
Figure 18:
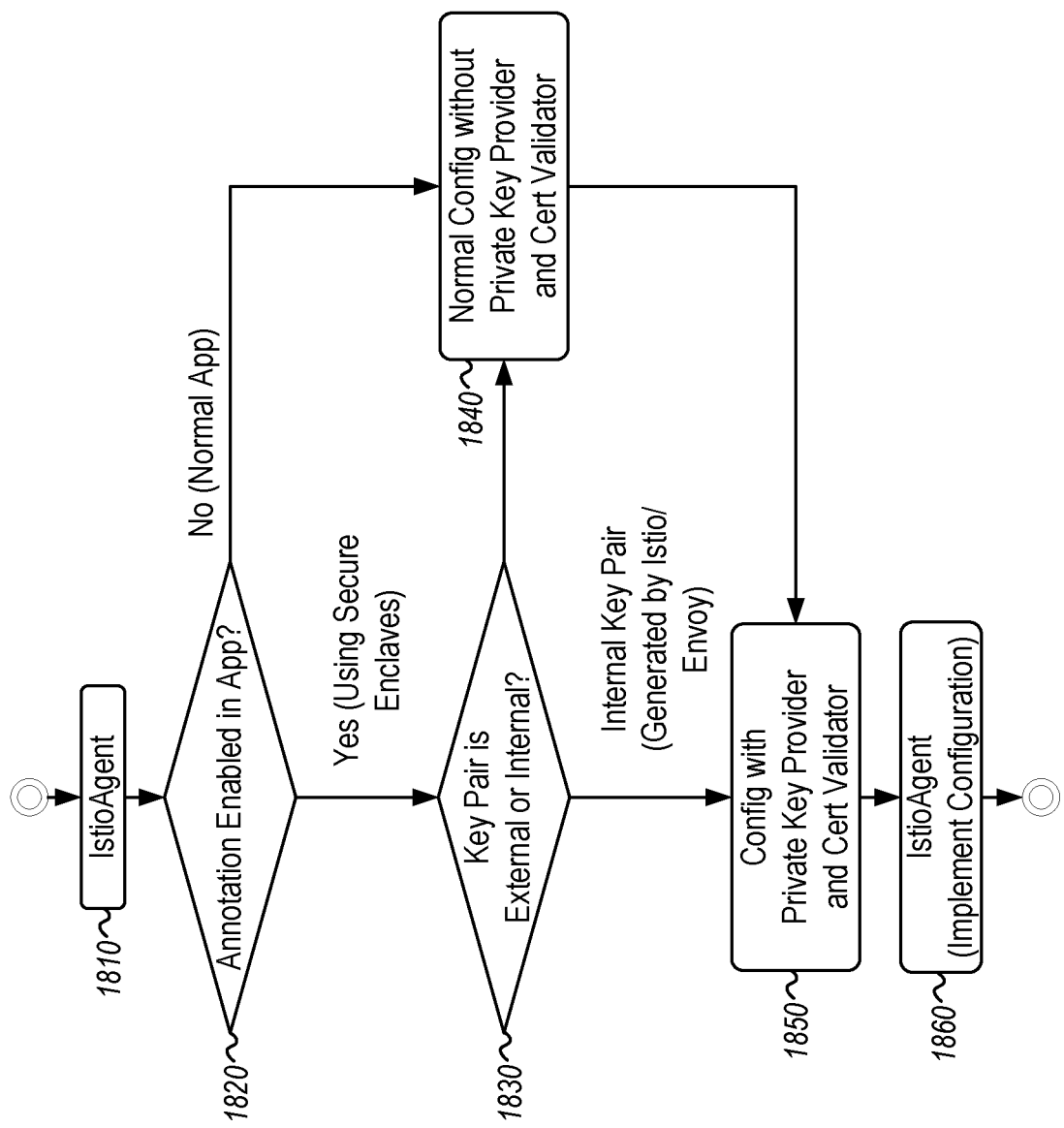
FIG. 18 illustrates a flowchart of agent operations for Service Mesh mTLS Key Generation and mTLS Key Protection with a confidential computing architecture, according to an example.

Further example are provided with reference to FIGS. 16 to 18 to illustrate Service Mesh mTLS Key Protection with confidential computing technologies. In particular, the following techniques can be used to protect mTLS keys in confidential computing enclaves on Kubernetes Container systems.

FIG. 16 depicts an architecture design 1600 of a Service Mesh mTLS Key Generation and mTLS Key Protection with an SGX Architecture. In particular, this illustrates the use of a confidential computing technology (e.g., Intel® SGX) for the purpose of Istio Key Management. In a service mesh, Envoy and Istio Agent will use mTLS Private Key Protection (secure generation and use of the mTLS private key) for conducting secure mTLS communications between Network Functions and Applications.

In an example, a single SGX enclave 1612 is used both for Secure mTLS key generation and mTLS key protection while in use for mTLS handshake security. In this case the single SGX enclave 1612 is created by and used by the Istio Envoy sidecar proxy 1622. In another example, two enclaves are generated, one each created by the Istio-Agent 1632 and other by Envoy 1622.

In a two-enclave example, the Istio-Agent Enclave generates the mTLS key inside the Confidential Computing enclave environment. Istio Agent 1632 then sends the mTLS public key (K-pub) for Signing using Istiod 1642. (This ties into the architecture and flows described with reference to FIGS. 10 to 15). The mTLS private key uses a confidential computing sealing mechanism (e.g. SGX Sealing) to store the mTLS key securely on local storage, which is read by the Envoy enclave. Both Enclaves are owned by the same owner, such as may be demonstrated by the same value in the MRSIGNER SGX property attribute. Envoy uses its enclave for all mTLS connection setups, thereby protecting the mTLS private key while in use or while stored.

FIG. 17A depicts a sequence illustrating data plane operations for Service Mesh mTLS Key Generation and mTLS Key Protection within a secure compute configuration. Specifically, this example shows how Envoy 1720 performs private key generation and key protection, with the use of one enclave (provided by SGX, specifically, SGX enclave 1740). In the sequence, an HTTPS request is provided from a downstream entity 1710 to the Envoy instance 1722 (operation 2.1). The Envoy instance 1722 contacts an SSL handler (Boring SSL 1730) to perform a TLS handshake (operation 2.2). This causes a peer certificate validation process 1701 to be performed between the SSL handler 1730 and the certificate validator 1726 (operations 2.3, 2.4, 2.5), and a signing/decryption process 1702 to be performed between the private key provider 1724, certificate validator 1726, the SSL handler 1730, and the enclave 1740 (operations 2.6, 2.7, 2.8, 2.9, 2.10). The TLS handshake is completed (operation 2.11) and the Envoy instance 1722 can process the HTTP request (operation 2.12). The Envoy instance 1722 then provides an HTTPS response to the downstream entity 1710 (operation 2.13).

FIGS. 17B and 17C depict a sequence illustrating control plane operations for Service Mesh mTLS Key Generation and mTLS Key Protection within a secure compute configuration. Specifically, this example shows how the IstioAgent 1712, the Envoy 1720, and a CertManager 1760, interact with each other at the control plane. In the sequence, a CA issuer 1762 uses a secure enclave 1764 to create an enclave and a key pair and quote (operation 0.0), and interacts with an API server 1780 via an attestation service 1770 to attest a CRD with a public key and quote (operation 0.1). Additional operations for attestation (operations 0.2, 0.3, 0.4) occur between the attestation service 1770 and the API server 1780, and with the CertManager 1760 (operations 0.5, 0.6).

Additional control plane operations of the sequence are performed between the IstioAgent 1712 and the Envoy instance 1722 (operations 0.7, 1.0, 1.1, 1.2) and among the private key provider 1724, enclave 1728, and Istiod 1750 (operations 1.3, 1.4, 1.5, 1.6, 1.7). A certificate signing request (CSR) occurs to the CertManager 1760 (operation 1.8), to invoke attestation operations between the CertManager 1760 and an Attestation Service 1770 (operations 1.9, 1.10, 1.11, 1.12, 1.13). This results in a signed certificate being provided to the Istiod 1750 (operation 1.14) and communicated to the IstioAgent 1712 (operation 1.15) with a response having the signed certificate (operation 1.16).

FIG. 17D depicts a sequence illustrating attestation service operations for Service Mesh mTLS Key Generation and mTLS Key Protection within a secure compute configuration. At the attestation service, a platform deployment pipeline 1703 performs operations among a provisioning certification caching service (PCCS) 1794, a PCK certificate ID retrieval tool 1796, and a provisioning certification service 1798 (operations 1.0, 1.1, 1.2, 1.3, 1.4). This results in a runtime pipeline 1704 to handle the attestation request, with operations performed among a cert manager 1790, attestation service 1792, and the PCCS 1794 (operations 2.0, 2.1, 2.2, 2.3, 2.4).

In a similar fashion, FIG. 18 depicts a flowchart 1800 illustrating Service Mesh mTLS Key Generation and mTLS Key Protection with SGX with use of an IstioAgent 1810. Here, this flowchart 1800 depicts primary key generation and key protection for one enclave, showing how an Istio-Agent 1810 initiates the configuration. The flowchart 1800 proceeds to an identification of the use of SGX (decision 1820), identification of a key pair as external or internal (decision 1830), and selection of configurations (operation 1840, 1850) for use by IstioAgent with Envoy (operation 1860).

The techniques described herein can be used to extend standard Kubernetes APIs for confidential computing. Because a variety of confidential computing technologies are broadly available, the approaches above may be deployed across a variety of computing systems in Edge, Core, Multi/Hybrid Cloud, or in Telco Central Offices.

As noted above, implementations may occur within initial set of 5G Control Plane functions, which can be deployed across the Edge-Core and need a common root of trust for mTLS. Further, such implementations allow multiple, different ISVs (Independent SW vendors) to use the same flows and deploy in an inter-operable manner on a confidential computing enabled system.

Figure 19:
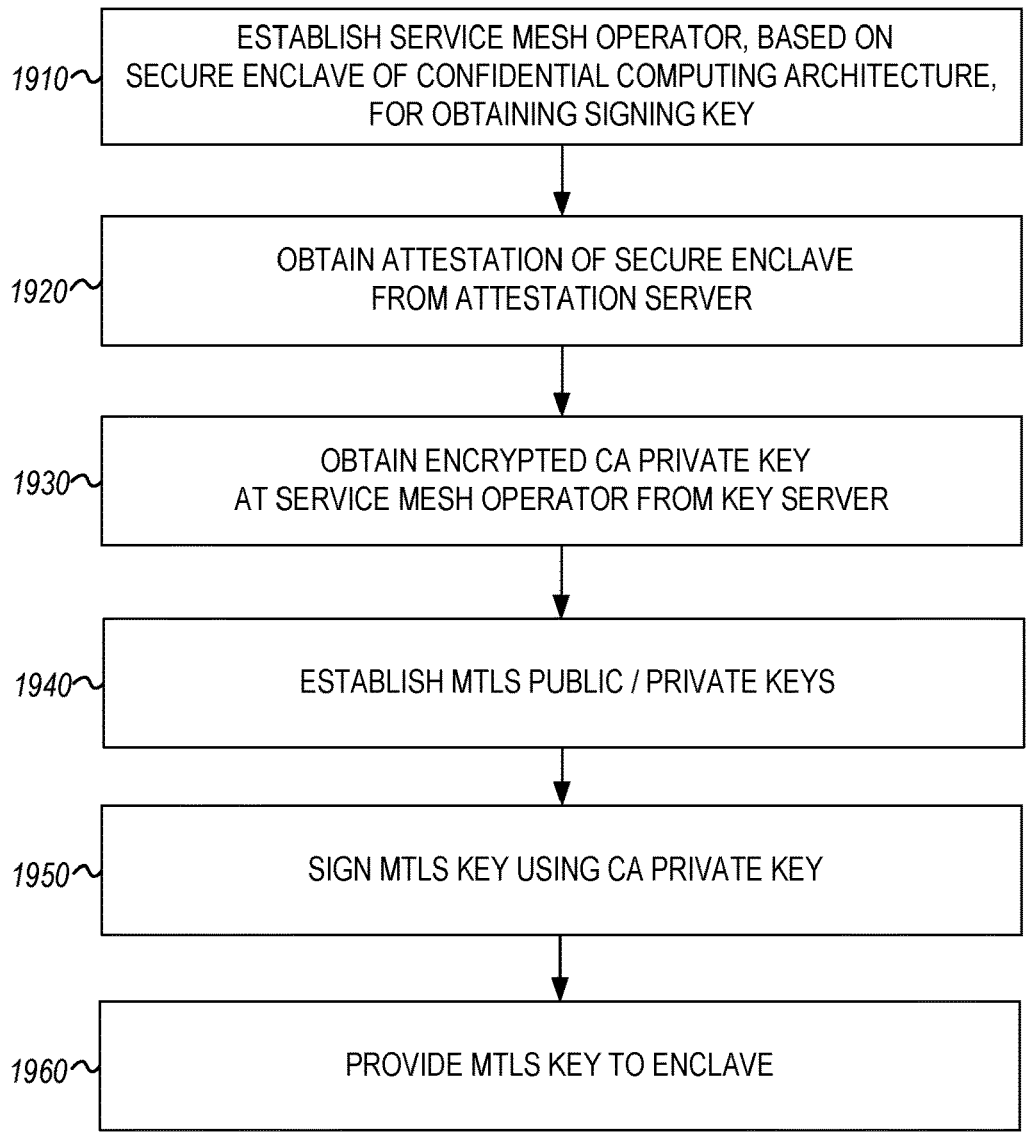
FIG. 19 illustrates a flowchart of example operations for CA signing using a confidential computing architecture, according to an example.

FIG. 19 illustrates a flowchart 1900 of an example process for establishing a certificate authority-based key protection with a confidential computing architecture (e.g., SGX). This flowchart may be supplemented by the operations or conditions indicated above.

At operation 1910, a service mesh operator is established, based on a secure enclave of a confidential computing architecture. This operator is used for obtaining a signing key (e.g., used in a mTLS key signing process, depicted in flowchart 2000 discussed below).

At operation 1920, attestation of the secure enclave is obtained from an attestation server.

At operation 1930, based on successful attestation, an encrypted certificate authority encrypted private key is obtained, from the key server, and is provided to the service mesh operator.

At operation 1940, public and private keys (for use with the mTLS communications) are established, and obtained at the service mesh operator.

At operation 1950, the public and private keys (for use with the mTLS communications) are signed using the certificate authority encrypted private key. The public and private keys then may be used for signing a key used during a mTLS session (referred to as a "session key") as follows.

Figure 20:
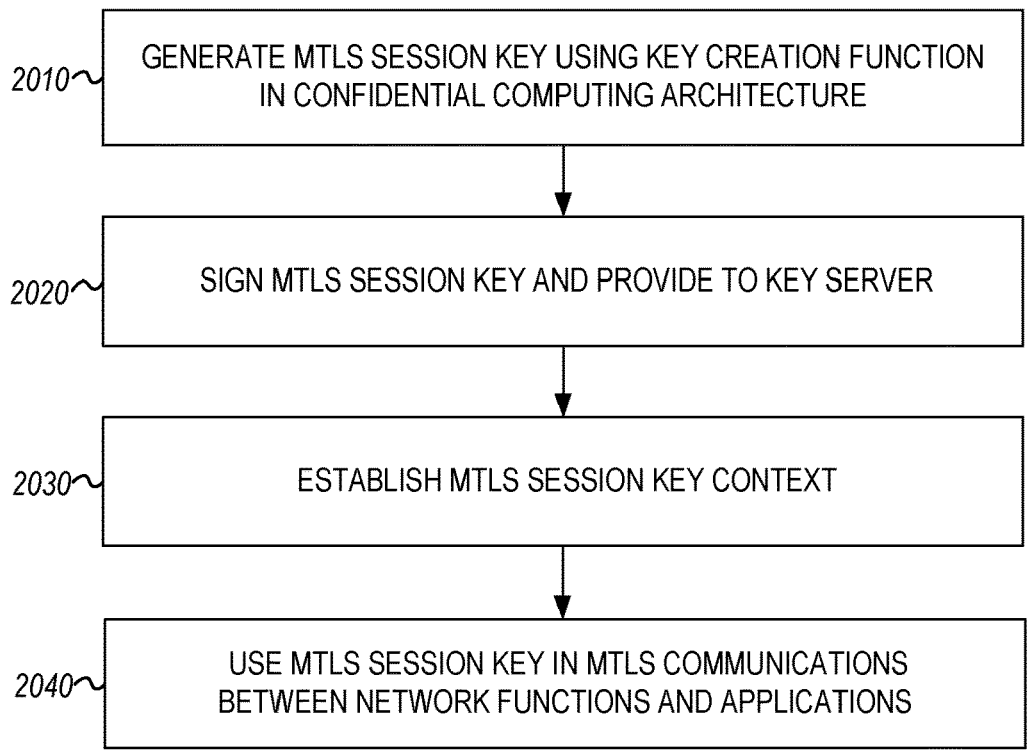
FIG. 20 illustrates a flowchart of example operations for mTLS Private Key security using a confidential computing architecture, according to an example.

FIG. 20 depicts a flowchart 2000 of a process for key generation and mTLS key protection. This flowchart may be supplemented by the operations or conditions indicated above.

At operation 2010, an mTLS session key is generated using a key creation function of a confidential computing architecture (e.g., SGX as discussed above, such as being based on aspects of the operations 1910-1950).

At operation 2020, the mTLS session key is signed and provided to a key server.

At operation 2030, the mTLS session key context is established in the service mesh (e.g., between Envoy and Istio Agent).

At operation 2040, the mTLS session key is used in mTLS communications between various network functions and applications.

Figure 21:
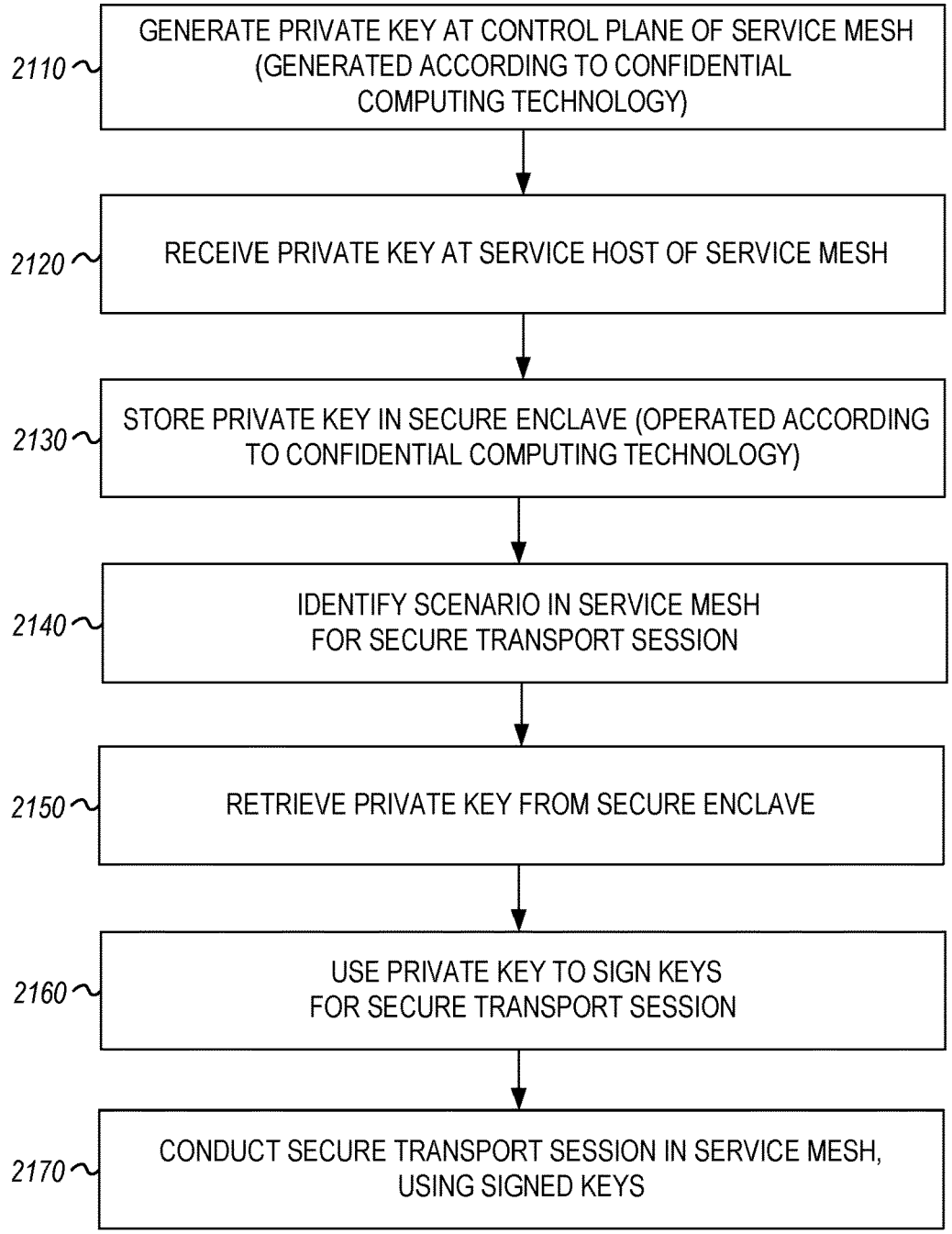
FIG. 21 illustrates a flowchart of example operations for implementing key security in a service mesh using a confidential computing architecture, according to an example.

FIG. 21 depicts a flowchart 2100 of a method for implementing key security in a service mesh using a confidential computing architecture, such as performed at a service host of the service mesh. The service mesh, for instance, may provide a plurality of communication services associated with a 5G Service-Based Architecture (5G SBA), as the 5G SBA operates control plane functions within a 5G telecommunications network accessed by a plurality of user equipment. It will be understood that additional operations and configurations (including Cloud-Native service mesh configurations) may occur consistent with the examples above.

At operation 2110, a private key is generated at the control plane of the service mesh, with use of a confidential computing technology. In an example, this private key may be generated at an operator in a control plane of the service mesh. For instance, the operator may be established in the control plane of the service mesh, using a secure enclave established according to the confidential computing technology (e.g., components compliant with one or more components compliant with one of: Intel Software Guard Extensions, Intel Trust Domain Extensions, AMD Secure Encrypted Virtualization, ARM Confidential Compute Architecture, or Apple Secure Enclave architecture, as noted above). Other operations at the operator may include use of attestation of the service enclave, such as attestation from an attestation server, established using the confidential computing technology; and use of a certificate authority encrypted private key at the operator, in response to the attestation, provided by a key server.

Further configurations of the service mesh, consistent with FIG. 8 and the other figures discussed above, may involve the key server being established in a management and security plane of the service mesh, as the key server operates using the confidential computing technology; and management of the control plane by a service manager, such as in a configuration where the control plane includes a certificate authority manager, an authentication policy manager, and an authorization policy manager. Such a service management may be connected to a plurality of service entities, including the service host, via a control plane interface.

The flowchart 2100 continues at operation 2120 with receiving the private key at the service host, and at operation 2130, with maintaining the private key in a secure enclave accessible to the service host. In an example, the secure enclave is operated according to the confidential computing technology (e.g., the same confidential computing technology used at the operator).

The flowchart continues at operation 2140 with identifying a scenario in the service mesh (e.g., a request, command, etc.) for use of a secure transport session. Operation 2150 continues with accessing and retrieving the (secured) private key maintained in the secure enclave, for use in establishing a secure transport session within the service mesh. The private key is not retrieved outside the secure enclave, and thus remains secure. In an example, the operations using the private key and for establishing secure transport session keys are performed inside the secure enclave (e.g., using well defined APIs).

In an example, the secure transport session is a mutual transport layer security (mTLS) session, and one or more public and private keys used for conducting the mTLS session are based on the retrieved (secured) private key. Operation 2160 then continues with use of the private key, in the secure enclave or other secure architecture, to sign keys (e.g., private/public keys) used in the mTLS secure transport session.

The flowchart 2100 ends at operation 2170 with performing communications between the service host and another entity within the service mesh, via the mTLS secure transport session, based on such use of the private key to sign one or more keys for the secure transport session. For instance, the secure transport session may be performed for at least one application of a data plane of the service mesh, based on the private key obtained at the service host (e.g., the private key being obtained from an operator in a control plane of the service mesh).

Consistent with the examples above, such communications in the mTLS secure transport session may include establishing and conducting communications between a proxy of the service host and a proxy or service host (another service host) of another entity. For instance, the service host and the another service host may operate respective microservices, as the secure communications are used to exchange data between the respective microservices.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example 1 is a system (e.g., device, appliance, apparatus) providing a service host of a service mesh, the service host comprising: network communication circuitry; secure storage to provide storage for at least one secure enclave; processing circuitry; and a storage medium including instructions embodied thereon, wherein the instructions, which when executed by the processing circuitry, cause the processing circuitry to: receive a private key at the service host, via the network communication circuitry, the private key generated according to a confidential computing technology; store the private key in a secure enclave of the secure storage, the secure enclave operated according to the confidential computing technology; retrieve (e.g., access) the private key from within the secure enclave of the secure storage, for use in establishing a secure transport session within the service mesh; and perform communications between the service host and another entity within the service mesh, in the secure transport session via the network communication circuitry, based on use of the private key in the secure enclave to sign one or more keys for the secure transport session.

In Example 2, the subject matter of Example 1 optionally includes subject matter wherein the communications are established between a proxy of the service host and a proxy of the another entity.

In Example 3, the subject matter of any one or more of Examples 1-2 optionally include subject matter wherein the another entity is another service host of the service mesh.

In Example 4, the subject matter of Example 3 optionally includes subject matter wherein the service host and the another service host operate respective microservices, and wherein the communications are used to exchange data between the respective microservices.

In Example 5, the subject matter of any one or more of Examples 1-4 optionally include subject matter wherein the secure transport session is performed for at least one application of a data plane of the service mesh, and wherein the private key is obtained at the service host from an operator in a control plane of the service mesh.

In Example 6, the subject matter of Example 5 optionally includes subject matter wherein the operator is established in the control plane using another secure enclave established according to the confidential computing technology, wherein the operator is to: request attestation of the another secure enclave, from an attestation server, using the confidential computing technology; and receive a certificate authority encrypted private key at the operator, in response to the attestation, the certificate authority encrypted private key received from a key server.

In Example 7, the subject matter of Example 6 optionally includes subject matter wherein the key server is established in a management and security plane of the service mesh, wherein the key server operates using the confidential computing technology.

In Example 8, the subject matter of any one or more of Examples 6-7 optionally include subject matter wherein the control plane is managed by a service manager, and wherein the control plane includes a certificate authority manager, an authentication policy manager, and an authorization policy manager.

In Example 9, the subject matter of Example 8 optionally includes subject matter wherein the service manager is connected to a plurality of service entities including the service host via a control plane interface.

In Example 10, the subject matter of any one or more of Examples 1-9 optionally include subject matter wherein the secure transport session is a mutual transport layer security (mTLS) session, and wherein one or more public and private keys used for conducting the mTLS session are based on the private key.

In Example 11, the subject matter of any one or more of Examples 1-10 optionally include subject matter wherein the secure enclave is provided on the device using secure processing operations (and optionally, with a secure enclave processor or another cryptographic processor inside or outside of the secure enclave), the confidential computing technology is established using one or more components compliant with one of: Intel Software Guard Extensions, Intel Trust Domain Extensions, AMD Secure Encrypted Virtualization, an ARM Confidential Compute Architecture, or an Apple Secure Enclave architecture.

In Example 12, the subject matter of any one or more of Examples 1-11 optionally include subject matter wherein the service mesh is configured to provide a plurality of communication services associated with a 5G Service-Based Architecture (5G SBA), the 5G SBA providing control plane functions within a 5G telecommunications network accessed by a plurality of user equipment.

Example 13 is a method for operating a service host in a service mesh, the method comprising: receiving a private key at the service host, the private key generated according to a confidential computing technology; maintaining the private key in a secure enclave accessible to the service host, the secure enclave operated according to the confidential computing technology; accessing the private key within the secure enclave, for use in establishing a secure transport session within the service mesh; and perform communications between the service host and another entity within the service mesh, via the secure transport session, based on use of the private key in the secure enclave to sign one or more keys for the secure transport session.

In Example 14, the subject matter of Example 13 optionally includes subject matter wherein the communications are established between a proxy of the service host and a proxy of the another entity.

In Example 15, the subject matter of any one or more of Examples 13-14 optionally include subject matter wherein the another entity is another service host of the service mesh.

In Example 16, the subject matter of Example 15 optionally includes subject matter wherein the service host and the another service host operate respective microservices, and wherein the communications are used to exchange data between the respective microservices.

In Example 17, the subject matter of any one or more of Examples 13-16 optionally include subject matter wherein the secure transport session is performed for at least one application of a data plane of the service mesh, and wherein the private key is obtained at the service host from an operator in a control plane of the service mesh.

In Example 18, the subject matter of Example 17 optionally includes subject matter wherein the operator is established in the control plane using another secure enclave established according to the confidential computing technology, wherein the operator is to: request attestation of the another secure enclave, from an attestation server, using the confidential computing technology; and receive a certificate authority encrypted private key at the operator, in response to the attestation, the certificate authority encrypted private key received from a key server.

In Example 19, the subject matter of Example 18 optionally includes subject matter wherein the key server is established in a management and security plane of the service mesh, wherein the key server operates using the confidential computing technology.

In Example 20, the subject matter of any one or more of Examples 18-19 optionally include subject matter wherein the control plane is managed by a service manager, and wherein the control plane includes a certificate authority manager, an authentication policy manager, and an authorization policy manager.

In Example 21, the subject matter of Example 20 optionally includes subject matter wherein the service manager is connected to a plurality of service entities including the service host via a control plane interface.

In Example 22, the subject matter of any one or more of Examples 13-21 optionally include subject matter wherein the secure transport session is a mutual transport layer security (mTLS) session, and wherein one or more public and private keys used for conducting the mTLS session are based on the private key.

In Example 23, the subject matter of any one or more of Examples 13-22 optionally include subject matter wherein the secure enclave is provided on the device using secure processing operations (and optionally, with a secure enclave processor or another cryptographic processor inside or outside of the secure enclave), and wherein the confidential computing technology is established using one or more components compliant with one of: Intel Software Guard Extensions, Intel Trust Domain Extensions, AMD Secure Encrypted Virtualization, ARM Confidential Compute Architecture, or an Apple Secure Enclave architecture.

In Example 24, the subject matter of any one or more of Examples 13-23 optionally include subject matter wherein the service mesh is configured to provide a plurality of communication services associated with a 5G Service-Based Architecture (5G SBA), the 5G SBA providing control plane functions within a 5G telecommunications network accessed by a plurality of user equipment.

Example 25 is at least one machine-readable storage device comprising instructions stored thereupon, which when executed by processing circuitry of a service mesh computing system, cause the processing circuitry to perform the methods of any of Examples 13 to 24.

Example 26 is a computing apparatus operated in a service mesh, comprising: network communication means; secure storage means; means for obtaining a private key at the computing apparatus, via the network communication means, the private key generated according to a confidential computing technology; means for maintaining the private key in the secure storage means, according to the confidential computing technology; means for using the private key, obtained from the secure storage means, in a secure compute environment to establish a secure transport session within the service mesh; and means for performing secure communications between the computing apparatus and another entity within the service mesh, in the secure transport session via the network communication means, based on using the private key in the secure compute environment to sign one or more keys for the secure transport session.

In Example 27, the subject matter of Example 26 optionally includes means for establishing the secure communications between a proxy means of the computing apparatus and a proxy means of the another entity.

In Example 28, the subject matter of any one or more of Examples 26-27 optionally include subject matter wherein the another entity is another service host of the service mesh.

In Example 29, the subject matter of Example 28 optionally includes means for exchanging data between respective microservices of the service mesh, wherein the service host and the another service host operate the respective microservices.

In Example 30, the subject matter of any one or more of Examples 26-29 optionally include means for obtaining the private key from an operator in a control plane of the service mesh, wherein the secure transport session is performed for at least one application of a data plane of the service mesh.

In Example 31, the subject matter of Example 30 optionally includes subject matter wherein the operator is established in the control plane using a secure enclave established according to the confidential computing technology, wherein the operator comprises: means for requesting attestation of the secure enclave, from an attestation server, using the confidential computing technology; and means for receiving a certificate authority encrypted private key at the operator, in response to the attestation, the certificate authority encrypted private key received from a key server.

In Example 32, the subject matter of Example 31 optionally includes subject matter wherein the key server is established in a management and security plane of the service mesh, wherein the key server operates using the confidential computing technology.

In Example 33, the subject matter of any one or more of Examples 31-32 optionally include subject matter wherein the control plane is managed by a service management means, and wherein the control plane includes a certificate authority means, an authentication policy means, and an authorization policy means.

In Example 34, the subject matter of Example 33 optionally includes subject matter wherein the service management means is connected to a plurality of service entities including the computing apparatus via a control plane interface.

In Example 35, the subject matter of any one or more of Examples 26-34 optionally include subject matter wherein the secure transport session is a mutual transport layer security (mTLS) session, and wherein one or more public and private keys used for conducting the mTLS session are based on the private key.

In Example 36, the subject matter of any one or more of Examples 26-35 optionally include subject matter wherein the confidential computing technology is operated on the device using secure processing operations in the processing means (and optionally, using a secure enclave processor or another cryptographic processor inside or outside of the secure enclave), and wherein the confidential computing technology is established using one or more components compliant with one of: Intel Software Guard Extensions, Intel Trust Domain Extensions, AMD Secure Encrypted Virtualization, an ARM Confidential Compute Architecture, or an Apple Secure Enclave architecture.

In Example 37, the subject matter of any one or more of Examples 26-36 optionally include subject matter wherein the service mesh is configured to provide a plurality of communication services associated with a 5G Service-Based Architecture (5G SBA), the 5G SBA providing control plane functions within a 5G telecommunications network accessed by a plurality of user equipment means.

Example 38 is an edge computing system, comprising a plurality of edge computing nodes, each of the plurality of edge computing nodes that is configured, adapted, or instantiated to perform any of the methods or configurations of Examples 1 to 37 in a Cloud-Native service mesh.

Example 39 is an edge computing system, comprising a plurality of edge computing nodes, each of the plurality of edge computing nodes that is configured, adapted, or instantiated to perform any of the methods or configurations of Examples 1 to 37 in a telecommunications service mesh.

Example 40 is a multi-tier edge computing system, comprising a plurality of edge computing nodes provided among on-premise edge, network access edge, or near edge computing settings, the plurality of edge computing nodes configured, adapted, or instantiated to implement the methods or configurations of Examples 1 to 37 in a service mesh.

Example 41 is an edge computing node, operable in an edge computing system, comprising processing circuitry coupled to transformation method circuitry that is configured, adapted, or instantiated to implement any of the methods or configurations of Examples 1 to 37 in a service mesh.

Example 42 is an edge computing node, operable as a server hosting the service and a plurality of additional services in an edge computing system, that is configured, adapted, or instantiated to perform any of the methods or configurations of Examples 1 to 37 in a service mesh.

Example 43 is an edge computing node, operable in a layer of an edge computing network as an aggregation node, network hub node, gateway node, or core data processing node, that is configured, adapted, or instantiated to perform any of the methods or configurations of Examples 1 to 37 in a service mesh.

Example 44 is an edge computing network, comprising networking and processing components that are configured, adapted, or instantiated to provide or operate a communications network, to enable an edge computing system to implement any of the methods or configurations of Examples 1 to 37 in a service mesh.

Example 45 is an on-premise server, operable in a private communications network distinct from a public edge computing network, that is configured, adapted, or instantiated as an edge computing system to implement any of the methods or configurations of Examples 1 to 37 in a service mesh.

Example 46 is an edge computing system configured as an edge mesh, provided with a microservice cluster, a microservice cluster with sidecars, or linked microservice clusters with sidecars, that is configured, adapted, or instantiated to implement any of the methods or configurations of Examples 1 to 37 in a service mesh.

Example 47 is an edge computing system, comprising circuitry that is configured to implement services with one or more isolation environments provided among dedicated hardware, virtual machines, containers, or virtual machines on containers, the edge computing system configured, adapted, or instantiated to implement any of the methods or configurations of Examples 1 to 37 in a service mesh.

Example 48 is an edge computing system, comprising networking and processing components to communicate with a user equipment device, client computing device, provisioning device, or management device to implement any of the methods or configurations of Examples 1 to 37 in a service mesh.

Example 49 is networking hardware with network functions implemented thereupon, operable within an edge computing system, the network functions configured, adapted, or instantiated to implement any of the methods or configurations of Examples 1 to 37 in a service mesh.

Example 50 is an edge computing system that is configured, adapted, or instantiated to implement services with any of the methods or configurations of Examples 1 to 37 in a service mesh, with the services relating to one or more of: compute offload, data caching, video processing, network function virtualization, radio access network management, augmented reality, virtual reality, autonomous driving, vehicle assistance, vehicle communications, industrial automation, retail services, manufacturing operations, smart buildings, energy management, internet of things operations, object detection, speech recognition, healthcare applications, gaming applications, or accelerated content processing.

Example 51 is an apparatus of an edge computing system comprising: one or more processors and one or more computer-readable media comprising instructions that, when executed by the one or more processors, cause the one or more processors to perform any of the methods or configurations of Examples 1 to 37 in a service mesh.

Example 52 is one or more computer-readable storage media comprising instructions to cause an electronic device of an edge computing system, upon execution of the instructions by one or more processors of the electronic device, to perform any of the methods or configurations of Examples 1 to 37 in a service mesh.

Example 53 is a computer program used in an edge computing system, the computer program comprising instructions, wherein execution of the program by a processing element in the edge computing system is to cause the processing element to perform any of the methods or configurations of Examples 1 to 37 in a service mesh.

Example 54 is an edge computing appliance device operating as a self-contained processing system, comprising a housing, case or shell, network communication circuitry, storage memory circuitry, and processor circuitry, adapted to perform any of the methods or configurations of Examples 1 to 37 in a service mesh.

Example 55 is an apparatus of an edge computing system comprising means to perform any of the methods or configurations of Examples 1 to 37.

Example 56 is an apparatus of an edge computing system comprising logic, modules, or circuitry to perform any of the methods or configurations of Examples 1 to 37.

Although the preceding implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

What is claimed is:

1. A device providing a service host of a service mesh, the service host comprising:
   network communication circuitry;
   secure storage to provide a secure enclave;
   processing circuitry; and
   a storage medium including instructions embodied thereon, wherein the instructions, which when executed by the processing circuitry, cause the processing circuitry to:
   receive a private key at the service host, via the network communication circuitry, the private key generated according to a confidential computing technology;
   store the private key in the secure enclave, the secure enclave operated according to the confidential computing technology;
   access the private key within the secure enclave of the secure storage, for use in establishing a secure transport session within the service mesh; and
   perform communications between the service host and another entity within the service mesh, in the secure transport session via the network communication circuitry, based on use of the private key in the secure enclave to sign one or more keys for the secure transport session.

2. The device of claim 1, wherein the communications are established between a proxy of the service host and a proxy of the another entity, wherein the another entity is another service host of the service mesh.

3. The device of claim 2, wherein the service host and the another service host operate respective microservices, and wherein the communications are used to exchange data between the respective microservices.

4. The device of claim 1, wherein the secure transport session is performed for at least one application of a data plane of the service mesh, and wherein the private key is obtained at the service host from an operator in a control plane of the service mesh.

5. The device of claim 4, wherein the operator is established in the control plane using another secure enclave established according to the confidential computing technology, wherein the operator is to:
   request attestation of the another secure enclave, from an attestation server, using the confidential computing technology; and
   receive a certificate authority encrypted private key at the operator, in response to the attestation, the certificate authority encrypted private key received from a key server.

6. The device of claim 5, wherein the key server is established in a management and security plane of the service mesh, wherein the key server operates using the confidential computing technology.

7. The device of claim 5, wherein the control plane is managed by a service manager, and wherein the control plane includes a certificate authority manager, an authentication policy manager, and an authorization policy manager, and wherein the service manager is connected to a plurality of service entities including the service host via a control plane interface.

8. The device of claim 1, wherein the secure transport session is a mutual transport layer security (mTLS) session, and wherein one or more public and private keys used for conducting the mTLS session are based on the private key.

9. The device of claim 1, wherein the secure enclave is provided on the device using secure processing operations, and wherein the confidential computing technology is established using one or more components compliant with one of: Intel Software Guard Extensions, Intel Trust Domain Extensions, AMD Secure Encrypted Virtualization, an ARM Confidential Compute Architecture, or an Apple Secure Enclave architecture.

10. The device of claim 1, wherein the service mesh is configured to provide a plurality of communication services associated with a 5G Service-Based Architecture (5G SBA), the 5G SBA providing control plane functions within a 5G telecommunications network accessed by a plurality of user equipment.

11. A method for operating a service host in a service mesh, the method comprising:
   receiving a private key at the service host, the private key generated according to a confidential computing technology;
   maintaining the private key in a secure enclave accessible to the service host, the secure enclave operated according to the confidential computing technology;
   accessing the private key within the secure enclave, for use in establishing a secure transport session within the service mesh; and
   performing communications between the service host and another entity within the service mesh, via the secure transport session, based on use of the private key in the secure enclave to sign one or more keys for the secure transport session.

12. The method of claim 11, wherein the communications are established between a proxy of the service host and a proxy of the another entity, wherein the another entity is another service host of the service mesh.

13. The method of claim 12, wherein the service host and the another service host operate respective microservices, and wherein the communications are used to exchange data between the respective microservices.

14. The method of claim 11, wherein the secure transport session is performed for at least one application of a data plane of the service mesh, and wherein the private key is obtained at the service host from an operator in a control plane of the service mesh.

15. The method of claim 14, wherein the operator is established in the control plane using another secure enclave established according to the confidential computing technology, wherein the operator is to:
   request attestation of the another secure enclave, from an attestation server, using the confidential computing technology; and
   receive a certificate authority encrypted private key at the operator, in response to the attestation, the certificate authority encrypted private key received from a key server;
   wherein the key server is established in a management and security plane of the service mesh, and wherein the key server operates using the confidential computing technology.

16. The method of claim 15, wherein the control plane is managed by a service manager, and wherein the control plane includes a certificate authority manager, an authentication policy manager, and an authorization policy manager, and wherein the service manager is connected to a plurality of service entities including the service host via a control plane interface.

17. The method of claim 11, wherein the secure transport session is a mutual transport layer security (mTLS) session, and wherein one or more public and private keys used for conducting the mTLS session are based on the private key.

18. The method of claim 11, wherein the secure enclave is provided using secure processing operations, wherein the confidential computing technology is established using one or more components compliant with one of: Intel Software Guard Extensions, Intel Trust Domain Extensions, AMD Secure Encrypted Virtualization, an ARM Confidential Compute Architecture, or an Apple Secure Enclave architecture.

19. The method of claim 11, wherein the service mesh is configured to provide a plurality of communication services associated with a 5G Service-Based Architecture (5G SBA), the 5G SBA providing control plane functions within a 5G telecommunications network accessed by a plurality of user equipment.

20. At least one machine-readable storage device comprising instructions stored thereupon, which when executed by processing circuitry of a service mesh computing system, cause the processing circuitry to operate a service host in a service mesh, with operations to:

receive a private key at the service host, the private key generated according to a confidential computing technology;

store the private key in a secure enclave, the secure enclave operated according to the confidential computing technology;

access the private key within the secure enclave, for use in establishing a secure transport session within the service mesh; and perform communications between the service host and another entity within the service mesh, in the secure transport session, based on use of the private key in the secure enclave to sign one or more keys for the secure transport session.

* * * * *